US012671306B2

(12) United States Patent 
Yoscovich et al.

(10) Patent No.: US 12,671,306 B2 
(45) Date of Patent: Jun. 30, 2026

(54) POWER CONVERSION DEVICE AND APPARATUS

(71) Applicant: Solaredge Technologies Ltd., Herzeliya (IL)

(72) Inventors: Ilan Yoscovich, Givatayim (IL); Tzachi Glovinsky, Petah Tikva (IL); Daniel Zmood, Ness Ziona (IL); David Avraham, Givat Koah (IL)

(73) Assignee: Solaredge Technologies Ltd., Herzeliya (IL)

( * ) Notice: Subject to any disclaimer, the term of this patent is extended or adjusted under 35 U.S.C. 154(b) by 308 days.

(21) Appl. No.: 18/490,892

(22) Filed: Oct. 20, 2023

(65) Prior Publication Data

US 2024/0146171 A1 May 2, 2024

Related U.S. Application Data

(60) Provisional application No. 63/419,819, filed on Oct. 27, 2022.

(51) Int. Cl.
 H02M 7/487 (2007.01)
 H02M 1/00 (2006.01)
(52) U.S. Cl.
 CPC ......... H02M 1/0003 (2021.05); H02M 7/487 (2013.01)
(58) Field of Classification Search
 CPC ........................... H02M 1/0003; H02M 7/487
 See application file for complete search history.

(56) References Cited

U.S. PATENT DOCUMENTS

| | | | | |
|---|---|---|---|---|
| 9,276,413 | B1* | 3/2016 | Zhang | H02J 50/12 |
| 9,960,712 | B2* | 5/2018 | Rodriguez | H02J 7/34 |
| 10,218,285 | B2* | 2/2019 | Mihalache | H02M 1/12 |
| 10,924,031 | B2 | 2/2021 | Li et al. | |
| 2012/0218795 | A1 | 8/2012 | Mihalache | |
| 2017/0310240 | A1 | 10/2017 | Li et al. | |
| 2024/0204683 | A1* | 6/2024 | Szlafsztein | H02M 7/5387 |

FOREIGN PATENT DOCUMENTS

| | | |
|---|---|---|
| CN | 213782882 U | 7/2021 |
| EP | 3174190 A1 | 5/2017 |
| EP | 3758213 A1 | 12/2020 |
| EP | 3852261 A1 | 7/2021 |

OTHER PUBLICATIONS

Oct. 9, 2025—European Examination Report—EP App. 23206381. 8.

(Continued)

*Primary Examiner* — Adolf D Berhane 
(74) *Attorney, Agent, or Firm* — Banner & Witcoff, Ltd.

(57) ABSTRACT

A power converter employing a plurality of parallel high-frequency switching legs, and a low-frequency switching leg, is disclosed. A load may be coupled between the high-frequency switching legs and the low-frequency switching leg. A number of levels of a power waveform produced by the power converter may be higher than the number of levels of the high-frequency switching legs. The low-frequency switching leg may employ switches which may have low switching frequency characteristics, low conduction losses, and may be less expensive.

20 Claims, 13 Drawing Sheets

(56) References Cited

OTHER PUBLICATIONS

I. Da Silva, et al., "Hybrid Modular Multilevel DSCC Inverter for Open-End Winding Induction Motor Drives", IEEE Transactions on Industry Applications, IEEE Service Center, Piscataway, NJ, US, vol. 53, No. 2, Mar. 1, 2017.

T. Lee et al., "Hybrid PWM Strategy for Power Efficiency Improvement of 5-Level TNPC Inverter and Current Distortion Compensation Method," Electronics 2019, 8, 76.

J. Zhang et al., "Hybrid Multilevel Converters: Topologies, Evolutions and Verifications," Energies 2019, 12, 615.

R. Gong et al., "Power balance modulation strategy for hybrid cascaded H-bridge multi-level inverter," Electrical Engineering 2022, 104:753-762.

M. Kaliamoorthy et al., "Generalised hybrid switching topology for a single-phase modular multilevel inverter," IET Power Electronics 2014, vol. 7, Iss. 10, pp. 2472-2485.

F. Khoucha et al., "A 7-Level Single DC Source Cascaded H-Bridge Multilevel Inverter with a Modified DTC Scheme for Induction Motor-Based Electric Vehicle Propulsion," International Journal of Vehicular Technology, vol. 2013, Articel ID 718920, 9 pages.

G. Capella et al., "Minimum signal modulation scheme based on a single carrier for interleaved operation of parallel phase legs in voltage source converters," IET Power Electronics 2014, vol. 7, Iss. 5, pp. 1305-1312.

M. Krishna & S. Vadhera, "Comparative Study of Hybrid and Cascaded H-Bridge Multilevel Inverters," International Journal of Research in Engineering and Technology 2013, vol. 2, Iss. 8.

P. Thongprasri, "A 5-Level Three-Phase Cascaded Hybrid Multilevel Inverter," International Journal of Computer and Electrical Engineering 2011, vol. 3, No. 6.

Z Quan et al., "Multilevel Voltage-Source Converter Topologies With internal parallel Modularity", IEEE Transactions on Industry Applications, vol. 56. No. 1, Jan./Feb. 2020.

Wang et. al, "Design and Implementation of Interleaved Hybrid Modulation Inverter", 2022 IET International Conference on Engineering Technologies and Applications.

Zhang et al., "A High Efficiency Inverter Design for Google Little Box Challenge", 2015 IEEE 3rd Workshop on Wide Bandgap Power Devices and Applications.

Liu et al., "A Novel Bidirectional Transformer-less Grid-connected Inverter with Common-Mode Leakage Current Suppression", 2020 IEEE Applied Power Electronics Conference and Exposition.

Kuhn, "An Improved Single Phase AC-DC Topology and Hybrid PWM Scheme ED", IP.com.

Chen et al., "New Type Single-Supply Four-Switch Five-Level Inverter With Frequency Multiplication Capability", IEEE Access.

Huang et al. "3kW Four-Level lying Capacitor Totem-Pole Bridgeless PF Rectifier with 200v GaN Devices", 2012 IEEE Energy Conversion Congress and Exposition.

Mar. 11, 2024—European Search Report—EP. App. No. 23206381. 8.

* cited by examiner

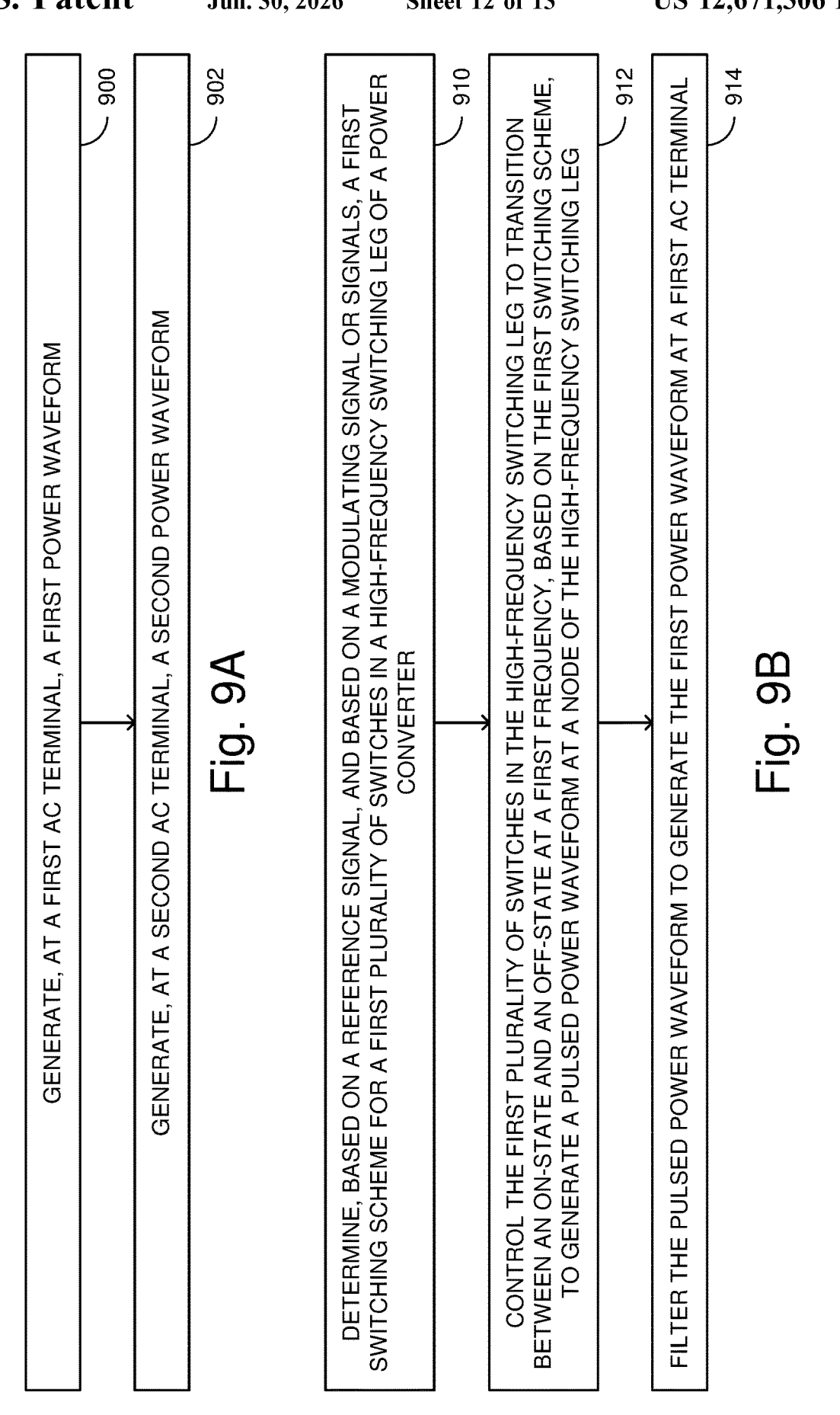

GENERATE, AT A FIRST AC TERMINAL, A FIRST POWER WAVEFORM ⟍900

GENERATE, AT A SECOND AC TERMINAL, A SECOND POWER WAVEFORM ⟍902

Fig. 9A

DETERMINE, BASED ON A REFERENCE SIGNAL, AND BASED ON A MODULATING SIGNAL OR SIGNALS, A FIRST SWITCHING SCHEME FOR A FIRST PLURALITY OF SWITCHES IN A HIGH-FREQUENCY SWITCHING LEG OF A POWER CONVERTER ⟍910

CONTROL THE FIRST PLURALITY OF SWITCHES IN THE HIGH-FREQUENCY SWITCHING LEG TO TRANSITION BETWEEN AN ON-STATE AND AN OFF-STATE AT A FIRST FREQUENCY, BASED ON THE FIRST SWITCHING SCHEME, TO GENERATE A PULSED POWER WAVEFORM AT A NODE OF THE HIGH-FREQUENCY SWITCHING LEG ⟍912

FILTER THE PULSED POWER WAVEFORM TO GENERATE THE FIRST POWER WAVEFORM AT A FIRST AC TERMINAL ⟍914

Fig. 9B

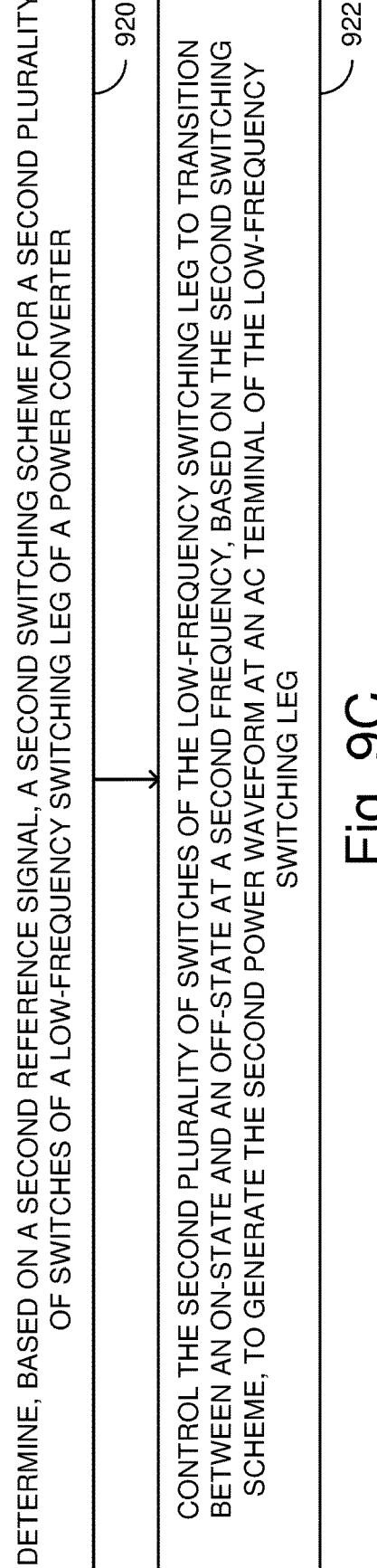

DETERMINE, BASED ON A SECOND REFERENCE SIGNAL, A SECOND SWITCHING SCHEME FOR A SECOND PLURALITY OF SWITCHES OF A LOW-FREQUENCY SWITCHING LEG OF A POWER CONVERTER

920

CONTROL THE SECOND PLURALITY OF SWITCHES OF THE LOW-FREQUENCY SWITCHING LEG TO TRANSITION BETWEEN AN ON-STATE AND AN OFF-STATE AT A SECOND FREQUENCY, BASED ON THE SECOND SWITCHING SCHEME, TO GENERATE THE SECOND POWER WAVEFORM AT AN AC TERMINAL OF THE LOW-FREQUENCY SWITCHING LEG

POWER CONVERSION DEVICE AND APPARATUS

CROSS REFERENCE TO RELATED APPLICATION

This application claims the benefit of U.S. Provisional Application No. 63/419,819, filed Oct. 27, 2022, the disclosure of which is incorporated by reference in its entirety.

FIELD OF THE DISCLOSURE

The disclosure relates generally to power systems. More specifically, the disclosure provides a power conversion device, apparatus, and method.

BACKGROUND OF THE DISCLOSURE

Power converters may change an input voltage from one setting (e.g., level, or frequency, or both) to another setting. Such power converters may be configured to convert direct current (DC) power to alternating current (AC) power. Such DC to AC converters may be referred to as inverters. Power converters may also convert DC power (e.g., at one voltage level) to DC power (e.g., at another voltage level), and may be referred to as DC to DC converters. Power converters may also convert AC power to DC power. Such AC to DC converters may be referred to as rectifiers.

BRIEF SUMMARY OF THE DISCLOSURE

The following presents a simplified summary of the disclosure in order to provide a basic understanding of some aspects of the disclosure. This summary is not an extensive overview of the disclosure. It is not intended to identify key or critical elements of the disclosure or to delineate the scope of the disclosure. The following summary merely presents some concepts of the disclosure in a simplified form as a prelude to the more detailed description provided below.

A first aspect of the disclosure relates to a power converter configured to converting power (e.g., convert DC power to AC power, convert DC power to DC power, or convert AC power to DC power). The power converter may comprise a plurality of high-frequency switching legs, and a low-frequency switching leg. Each of the plurality of high-frequency switching legs, and the low-frequency switching leg may comprise a plurality of switches. The high-frequency switching legs, and the low-frequency switching leg may both be coupled between a pair of DC terminals. The high-frequency switching legs may be configured to provide a first power waveform at a first AC terminal. The first power waveform may be a biased power waveform (e.g., biased by a voltage level at a time or a time interval). The low-frequency switching leg may be configured to provide a second power waveform. For example, the second power waveform may have, at the time or time-interval, voltage levels corresponding to the bias of the first power waveform (e.g., the second power waveform may be a square wave, or a modified square wave) at a second AC terminal. A load may be coupled between the first AC terminal and the second AC terminal. Thus, the load may be associated with a difference between the first power waveform, and the second power waveform, which may result in an AC power signal.

A second aspect of the disclosure may regard using a plurality of power converters for converting multi-phase power.

A third aspect of the disclosure may regard using a plurality of inverters where corresponding phases of the inverters are connected at an AC terminal.

A fourth aspect of the disclosure may regard a method in which a first power waveform is generated at a first AC terminal and a second power waveform is generated at a second AC terminal.

A fifth aspect of the disclosure may regard a method in which a switching scheme is determined for a first plurality of switches in a high-frequency switching leg based on a reference signal and a modulating signal or signals. The plurality of switches are controlled to transition between an on-state and an off-state at a first frequency, based on the determined switching scheme, to generate a pulsed power waveform at a high-frequency node of the high-frequency switching leg. A first power waveform is determined at a first AC terminal by filtering the pulsed power waveform.

A sixth aspect of the disclosure may regard a method in which a switching scheme for a plurality of switches of a low-frequency switching leg of a power converter is determined based on a reference signal. The plurality of switches of the low-frequency switching leg are controlled to transition between an on-state and an off-state at a second frequency, based on the switching scheme, to generate a second power waveform at a second AC terminal of the power converter.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

3

Figure 3A:
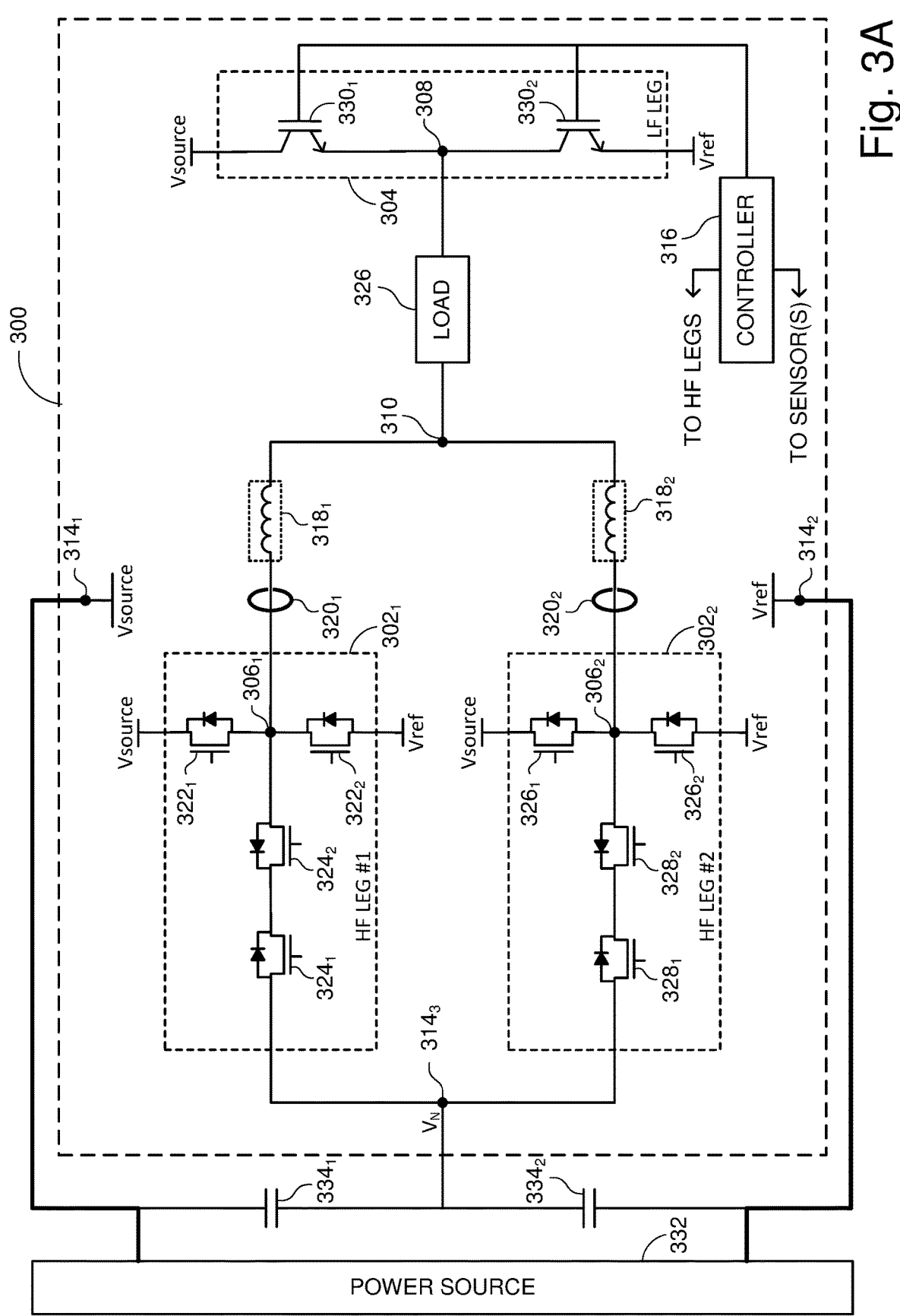
FIG. 3A illustrate an example of a power converter and related waveforms according to aspects of the disclosure herein.
Figures 3B, 3C, 3D, 3E, 3F, 3G:
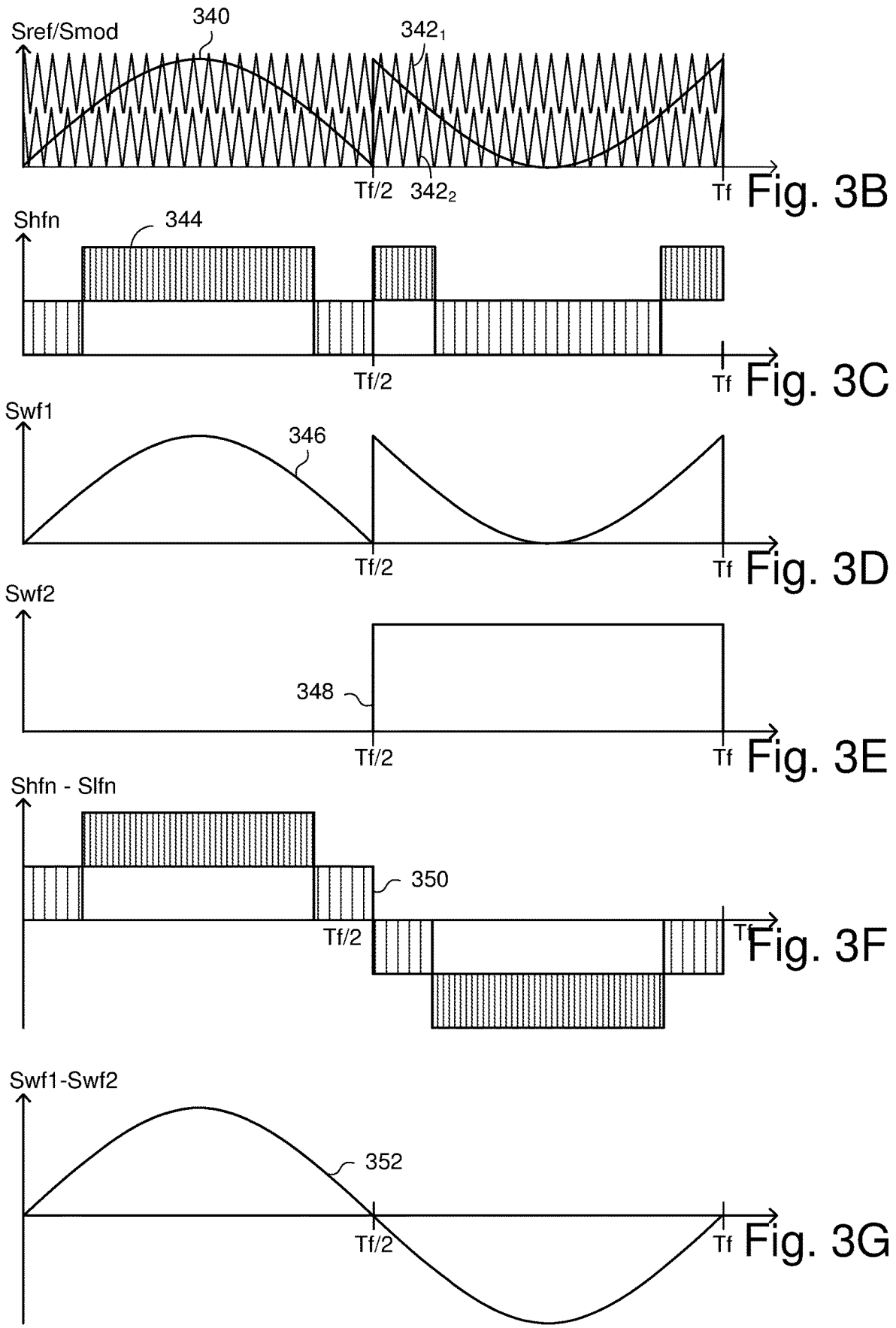
FIG. 3B illustrates an example of a reference waveform and a modulating waveform of a power converter according to aspects of the disclosure herein.
FIG. 3C illustrates an example of pulsed power waveform of a power converter according to aspects of the disclosure herein.
Figure 4A:
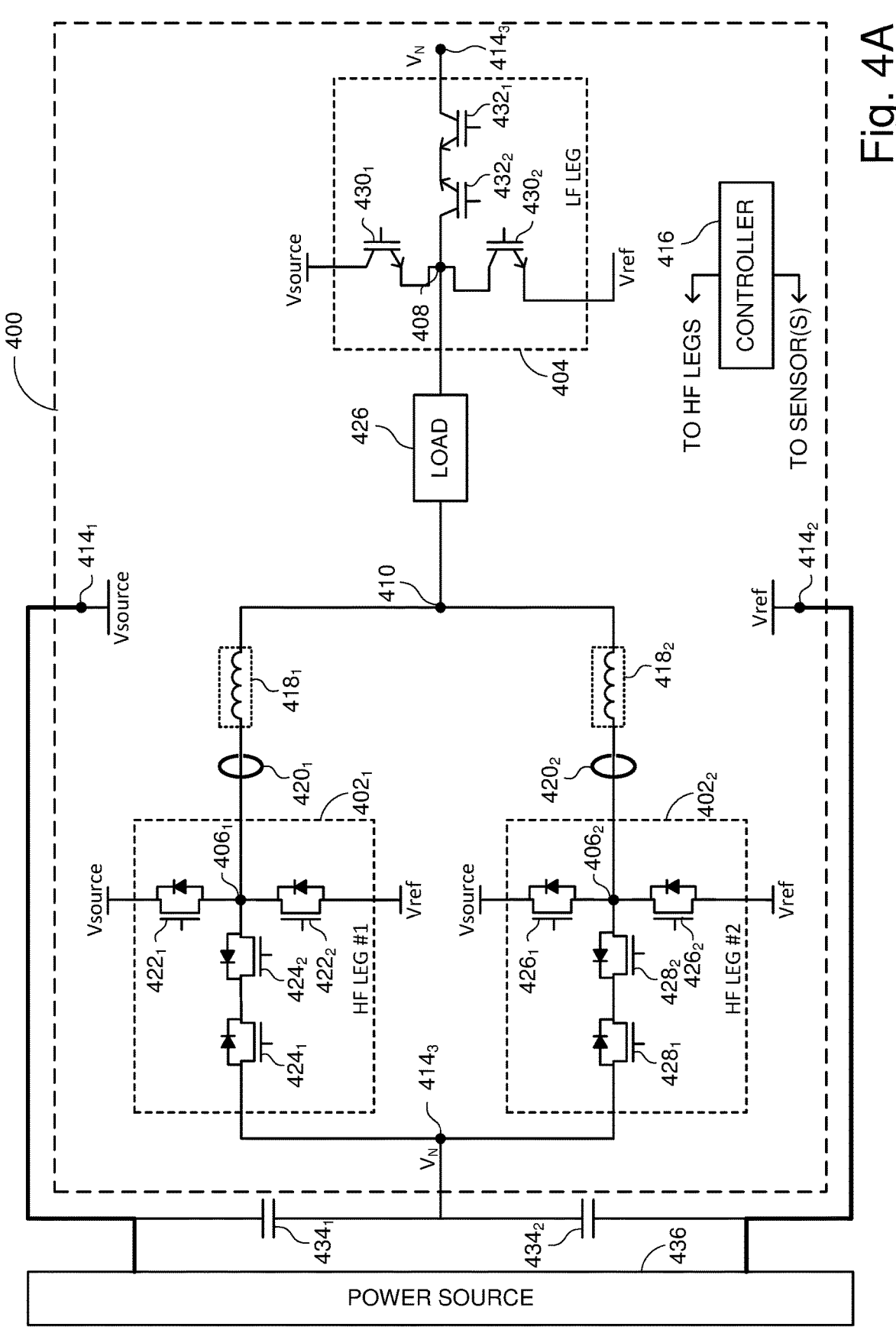
Figures 4B, 4C, 4D, 4E, 4F, 4G:
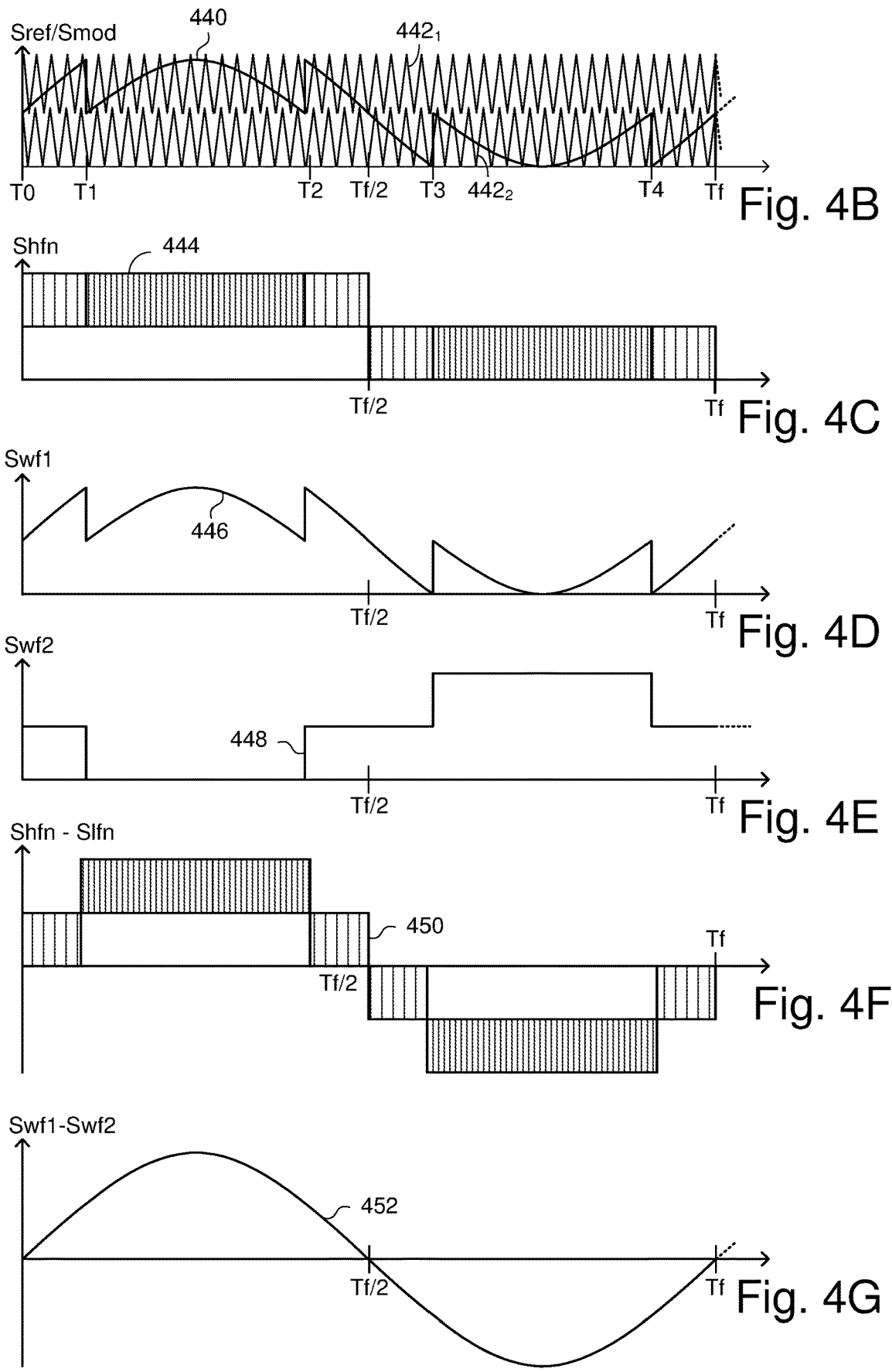
Figure 5:
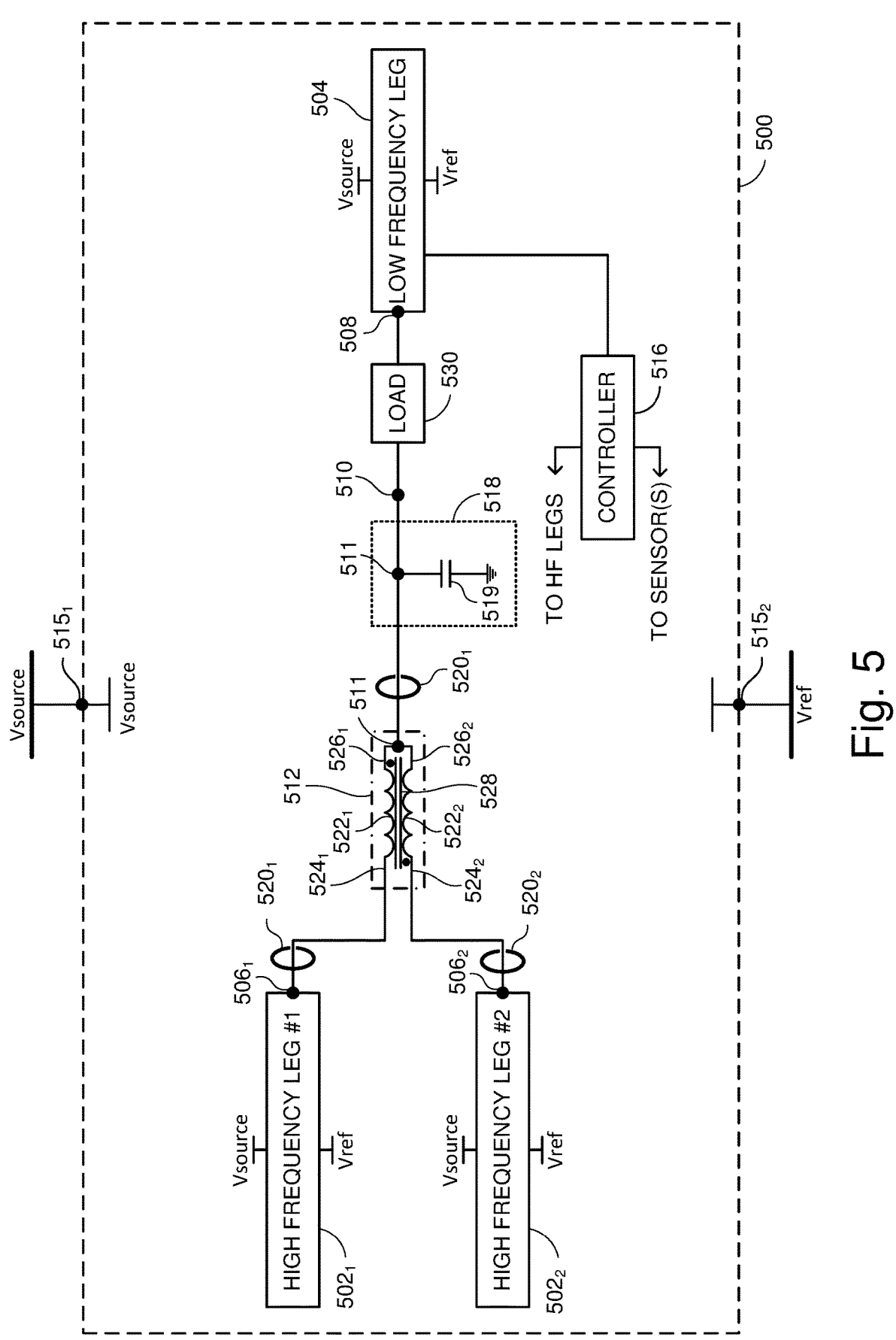
Figures 8A, 8B, 8C, 8D, 8E:
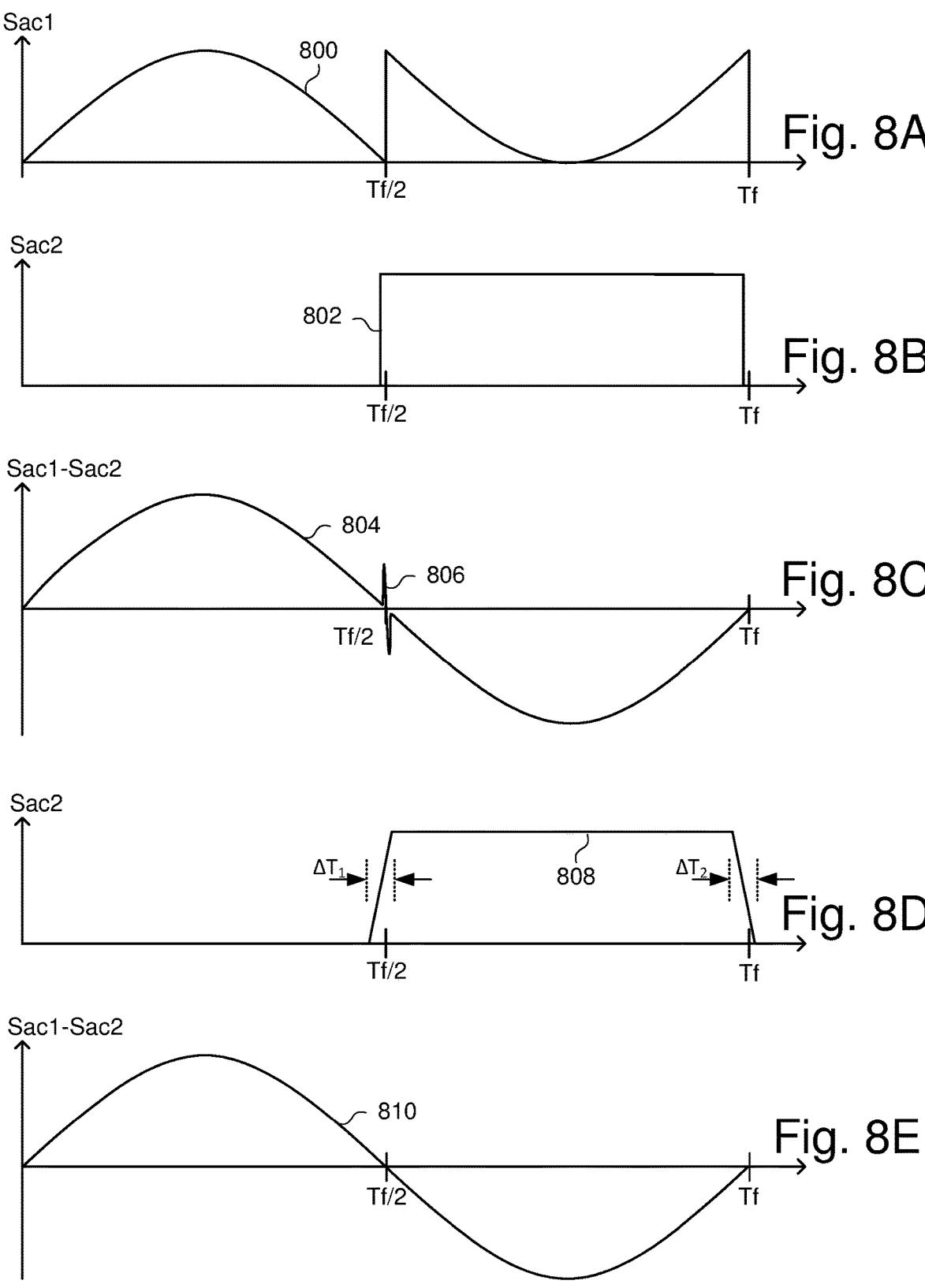

FIG. 3D illustrates an example of a first power waveform of a power converter according to aspects of the disclosure herein;

FIG. 3E illustrates an example of a second power waveform of a power converter according to aspects of the disclosure herein;

FIG. 3F illustrates an example of a PWM power waveform of a power converter according to aspects of the disclosure herein;

FIG. 3G illustrates an example of an AC power waveform of a power converter according to aspects of the disclosure herein;

FIG. 4A illustrate an example of a power converter and related waveforms, according to aspects of the disclosure herein;

FIG. 4B illustrates an example of a reference waveform and a modulating waveform of a power converter according to aspects of the disclosure herein;

FIG. 4C illustrates an example of pulsed power waveform of a power converter according to aspects of the disclosure herein;

FIG. 4D illustrates an example of a first power waveform of a power converter according to aspects of the disclosure herein;

FIG. 4E illustrates an example of a second power waveform of a power converter according to aspects of the disclosure herein;

FIG. 4F illustrates an example of a PWM power waveform of a power converter according to aspects of the disclosure herein;

FIG. 4G illustrates an example of an AC power waveform of a power converter according to aspects of the disclosure herein;

FIG. 5 illustrates an example of a power converter according to aspects of the disclosure herein;

Figure 6:
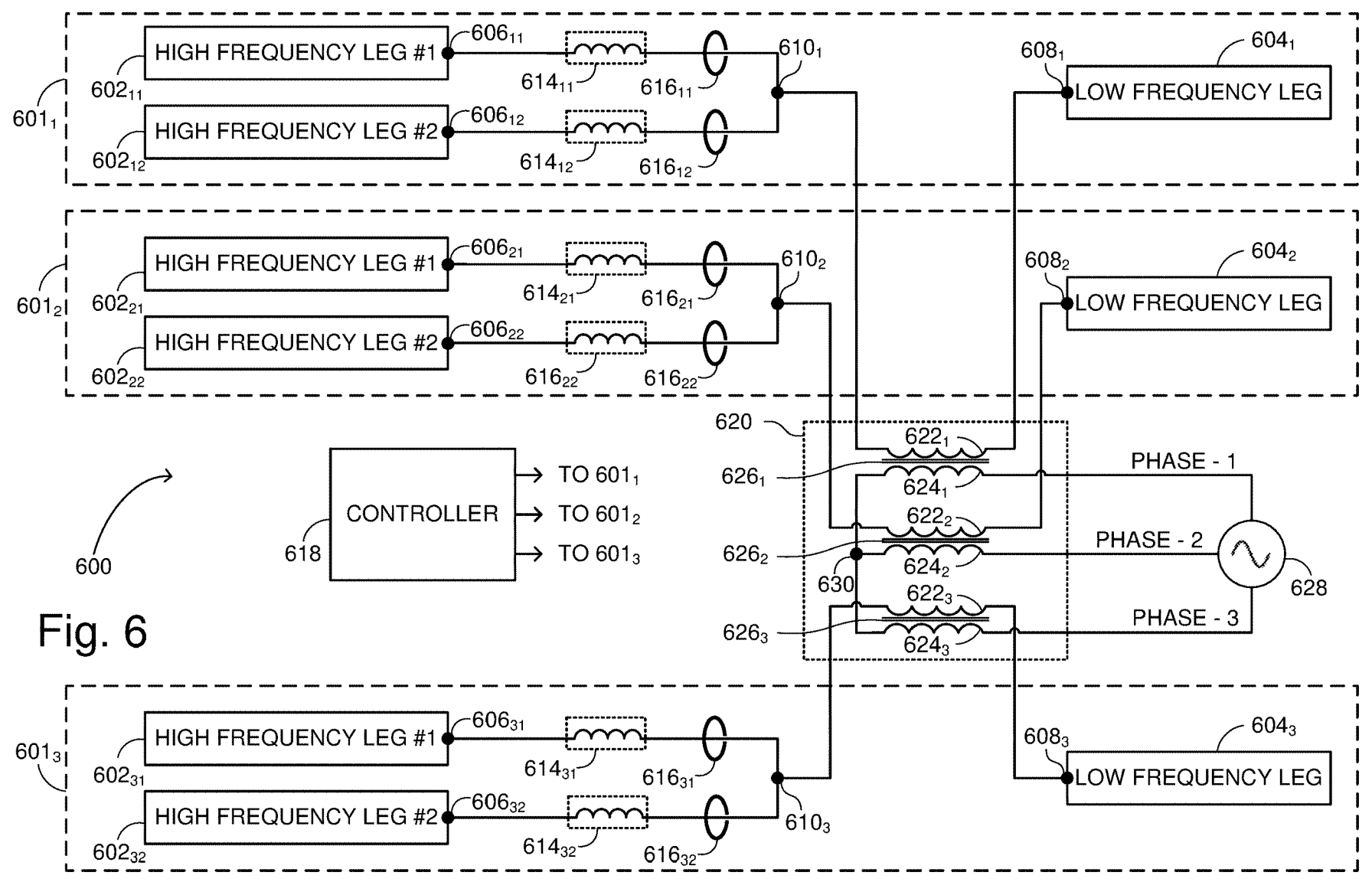

FIG. 6 illustrates an example of a three-phase apparatus according to aspects the disclosure herein;

Figure 7:
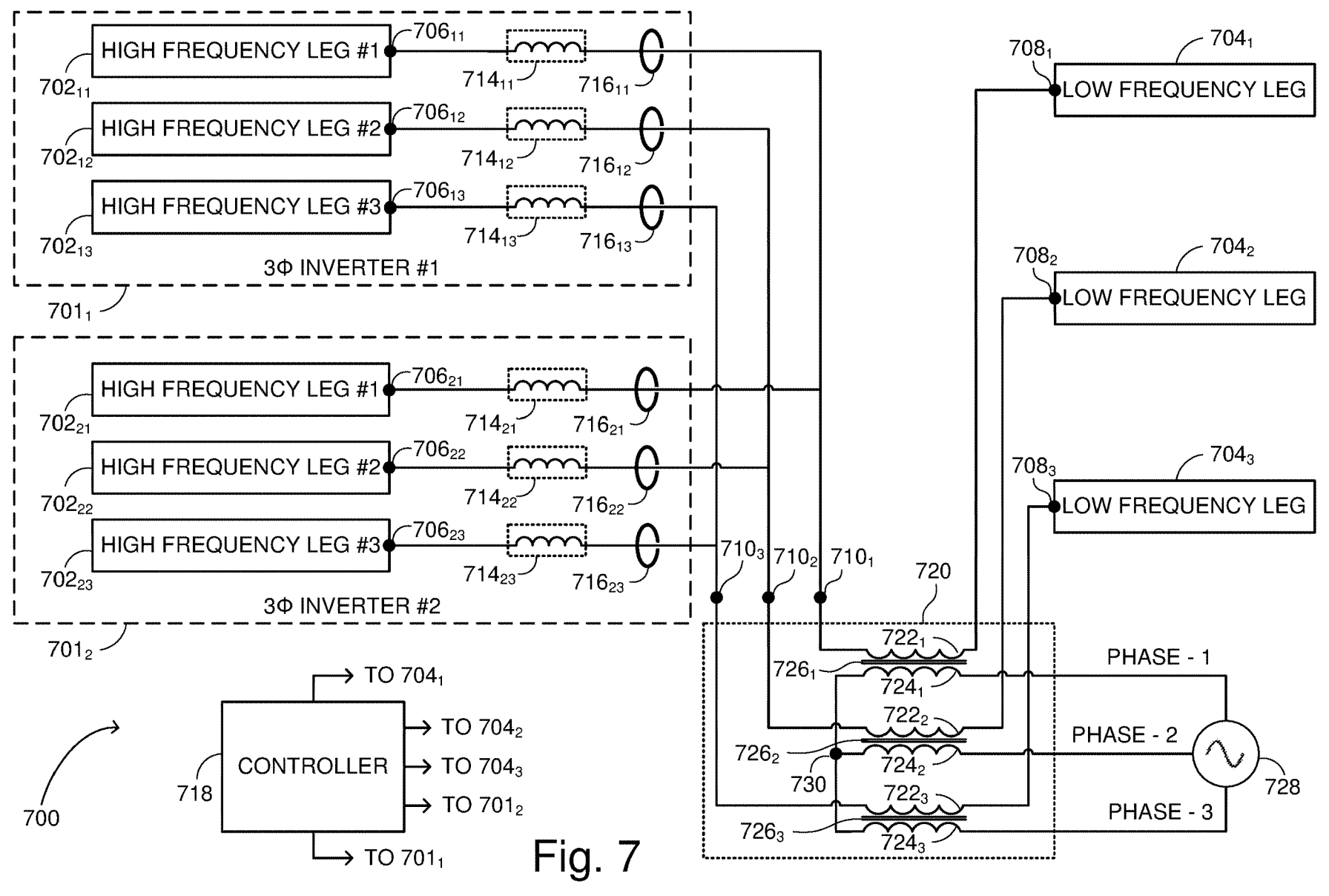

FIG. 7 illustrates an apparatus, employing two 3-phase inverters according to aspects of the disclosure herein;

FIG. 8A illustrate and example of first power waveform according to aspects of the disclosure herein;

FIG. 8B illustrate and example of first power waveform according to aspects of the disclosure herein;

FIG. 8C illustrates an example of an AC power waveform according to aspects of the disclosure herein;

FIG. 8D illustrate and example of first power waveform according to aspects of the disclosure herein;

FIG. 8E illustrates an example of an AC power waveform according to aspects of the disclosure herein;

FIG. 9A illustrates an example of a method for generating an AC power waveform, according to aspects of the disclosure herein;

FIG. 9B illustrates an example of a method for operating a high-frequency switching leg according to the disclosure herein; and FIG. 9C illustrates an example of a method for operating a low-frequency switching leg according to the disclosure herein.

DETAILED DESCRIPTION OF THE DISCLOSURE

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made without departing from the scope of the present disclosure.

In certain systems, it may be advantageous to employ multi-level power converters (e.g., a 3-levels inverter, a 5-levels inverter, a 7-levels inverter, and the like). To name just a few advantages, employing a multi-level power converter may reduce the total harmonic distortion (THD), may reduce the voltage difference over the switches of the power converter, and/or may reduce distortions in the input current.

Systems and methods described herein include a power converter, which employs a plurality of parallel high-frequency switching legs, and a low-frequency switching leg, where a load may be coupled between the high-frequency switching legs and the low-frequency switching leg. It is noted that the terms "high" and "low" are meant herein in a relative sense (e.g., the "high frequency" is higher than the "low frequency"), and are not intended to relate to a specific value or range of values. In a power converter described herein, a number of levels of a PWM power waveform produced by the power converter, may be higher than the number of levels of the high-frequency legs. For example, a 3-levels waveform may be generated from 2-levels high-frequency switching legs and a 2-levels low-frequency switching leg (e.g., as shown in FIGS. 2A-2G). A 5-levels waveform may be generated by 3-levels high-frequency switching legs and a 2-level low-frequency switching leg (e.g., as shown in FIGS. 3A-3G). The low-frequency switching leg may employ switches which may have low switching frequency characteristics, low conduction losses, and may be cheaper (e.g., relative to switches with high switching frequency characteristics). Switching the switches in the low-frequency switching leg at a low frequency may result in low switching losses (e.g., relative to the switching losses of the switches in the high-frequency switching leg). Also, since the low-frequency switching leg may employ cheaper switches, a power converter according to the disclosure herein may have improved cost efficiency. Employing a plurality of parallel high-frequency switching legs, which may be switching in phase, may allow to employ switches with lower current ratings at each high-frequency switching leg. Employing a plurality of parallel high-frequency switching legs, which may be switching out of phase, may allow a reduction in the switching frequency of each high-frequency switching leg, while maintaining effective switching frequency.

Aspects of the disclosure herein relate to a power converter and an apparatus for converting power. For example, aspects of the disclosure herein may relate to a power converter, configured to convert DC power to AC power, or convert DC power (e.g., at one voltage level) to DC power (e.g., at another voltage level). Aspects of the disclosure herein may relate to a power converter, configured to convert AC power to DC power. A power converter according to aspects of the disclosure herein may comprise a plurality of high-frequency switching legs, and a low-frequency switching leg. The plurality of high-frequency switching legs, and the low-frequency switching leg may comprise a plurality of switches. A controller may control the switches of the high-frequency switching legs to switch at a corresponding high frequency, so as to generate a first power waveform at a first AC terminal. The control may control the switches of the low-frequency switching leg to switch at a low frequency, so as to generate a second power waveform at a second AC terminal. The corresponding high frequencies of the high-frequency switching legs may be different from each other, but higher than the low frequency of the low-frequency switching leg. The controller may be configured to control the high-frequency switching legs to generate the first power waveform, such that the first power waveform may be biased, at a time or a time interval, by a voltage level. The controller may be configured to control the low-frequency switching leg so as to generate the second waveform, such that the voltage level of the second power waveform, at the time or the time interval, corresponds to the voltage level biasing the first power waveform. A load may be coupled between the first AC terminal and the second AC terminal. The load may be provided with a difference between the first power waveform and the second power waveform, which may result in an AC power waveform.

Figure 1:
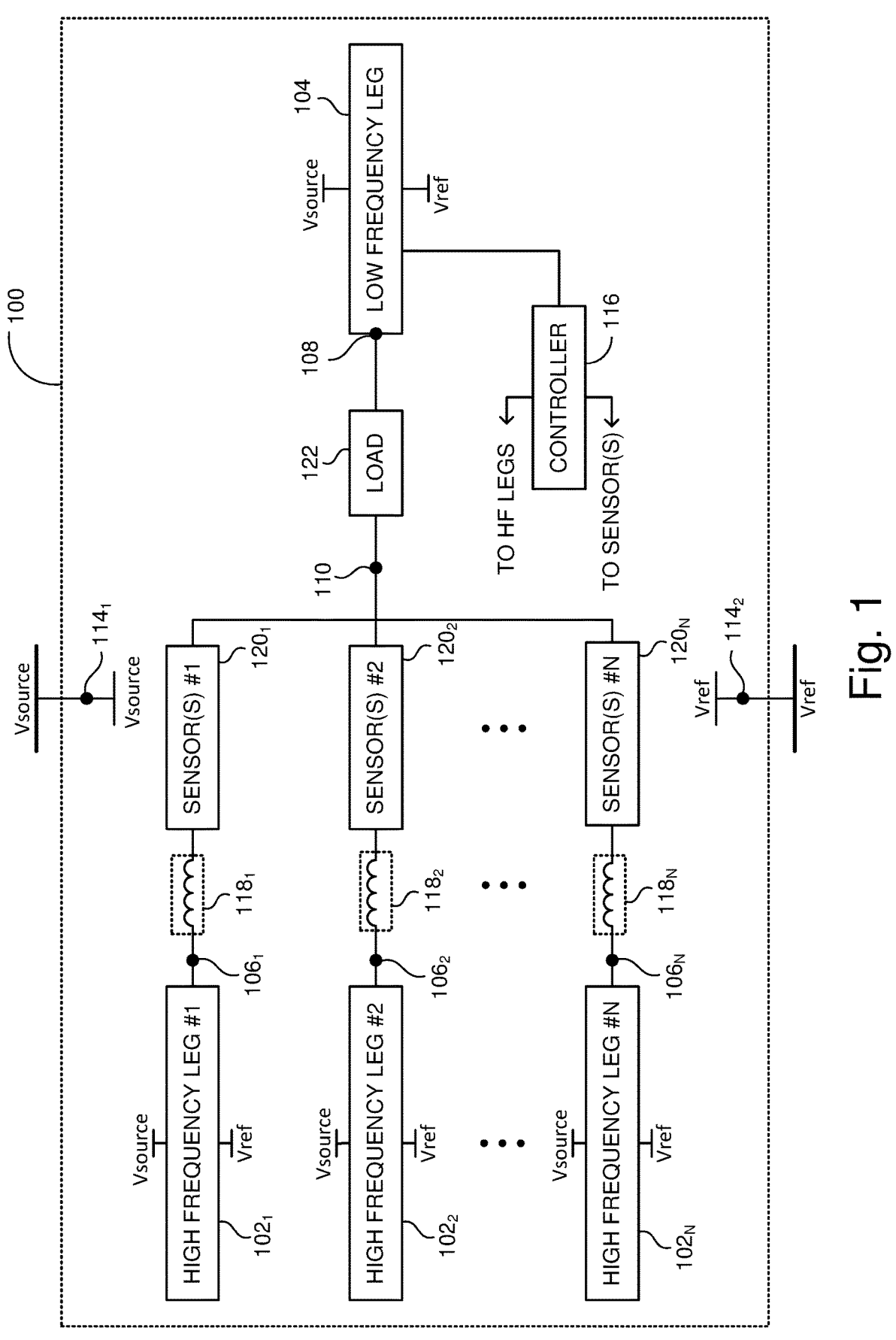
FIG. 1 illustrates examples of a power converter according to aspects of the disclosure herein.

Reference is made to FIG. 1, which illustrates an example of a power converter, generally referenced as power converter 100, in accordance with aspects of the disclosure herein. Power converter 100 may comprise a plurality of high-frequency switching legs $102_1$, $102_2$, . . . , $102_N$, and a low-frequency switching leg 104. Each of high-frequency switching legs $102_1$, $102_2$, . . . , $102_N$ may comprise a plurality of switches (e.g., as further elaborated below in conjunction with FIGS. 2A, 3A, and/or 4A), and a corresponding one of high-frequency nodes $106_1$, $106_2$, . . . , $106_N$. Low-frequency switching leg 104 may comprise a plurality of switches (e.g., as further elaborated below in conjunction with FIGS. 2A, 3A, and/or 4A), and an AC terminal 108. Power converter 100 may comprise an AC terminal 110. Power converter 100 may comprise a pair of DC terminals $114_1$ and $114_2$, and a controller 116. Power converter 100 may further comprise a plurality of filters $118_1$, $118_2$, . . . , $118_N$, each corresponding to a respective one of high-frequency switching legs $102_1$, $102_2$, . . . , $102_N$. Power converter 100 may comprise a plurality of sensor(s) $120_1$, $120_2$, . . . , $120_N$, each corresponding to a respective one of high-frequency switching legs $102_1$, $102_2$, . . . , $102_N$.

High-frequency switching legs $102_1$, $102_2$, . . . , $102_N$, and low-frequency switching leg 104 may be coupled (e.g., in parallel) between DC terminals $114_1$ and $114_2$, as indicated by the labels "Vsource" and "Vref" in FIG. 1. Each one of filters $118_1$, $118_2$, . . . , $118_N$ may be coupled between a corresponding one of high-frequency nodes $106_1$, $106_2$, . . . , $106_N$, and AC terminal 110. Each one of sensor(s) $120_1$, $120_2$, . . . , $120_N$, may be coupled between a corresponding one of high-frequency nodes $106_1$, $106_2$, . . . , $106_N$, and AC terminal 110. Controller 116 may be coupled to each of high-frequency switching legs $102_1$, $102_2$, . . . , $102_N$ (e.g., as indicated by the label "TO HF LEGS" in FIG. 1), to low-frequency switching leg 104, and to each of sensor(s) $120_1$, $120_2$, . . . , $120_N$ (e.g., as indicated by the label "TO SENSORS" in FIG. 1). A load 120 may be coupled between AC terminal 110, and AC terminal 108.

Each one of filters $118_1$, $118_2$, . . . , $118_N$ may be configured to filter an input signal thereto based on determined corresponding filter characteristics (e.g., a determined filter transfer function). For example, each one of filters $118_1$, $118_2$, . . . , $118_N$ may be a low-pass filter, a band-pass filter, a band-stop filter, a notch filter, a high-pass filter, or the like, implemented with passive, active, or both passive and active components, such as an inductor, a capacitor, a transistor, a diode, or an operational amplifier. In the example of FIG. 1, filters $118_1$, $118_2$, . . . , $118_N$ may comprise at least one inductor. Filters $118_1$, $118_2$, . . . , $118_N$ may comprise two inductors coupled in series at a connection point (e.g., which may also be referred to herein as "node"), and a capacitor coupled between the node and a reference node.

One or more of sensor(s) $120_1$, $120_2$, . . . , $120_N$ may be a current sensor (e.g., implemented by Current Transformer (CT) sensor, a Hall effect sensor, a zero flux sensor, or the like). One or more of sensor(s) $120_1$, $120_2$, . . . , $120_N$ may be a voltage sensor (e.g. implemented by a resistive or capacitive divider, a resistive or capacitive bridge, comparators, or the like). One or more of sensor(s) $120_1$, $120_2$, . . . , $120_N$ may comprise more than one sensor (e.g., a current sensor and a voltage sensor). Controller 116 may be implemented as microcontroller, Field Programmable Gate Array (FPGA) or an Application Specific Integrated Circuit (ASIC) configured to carry out a set of control instructions. Controller 116 may be a distributed device comprising several controllers. For example, one controller may control high-frequency switching legs $102_1$, $102_2$, . . . , $102_N$, and another controller may control low-frequency switching leg 104. In some instances controller 116 may comprise several controllers, and these controllers may communicate between one another via a network (e.g., a communication bus using a communication protocol, using a wired or a wireless network, or the like).

Figure 2A:
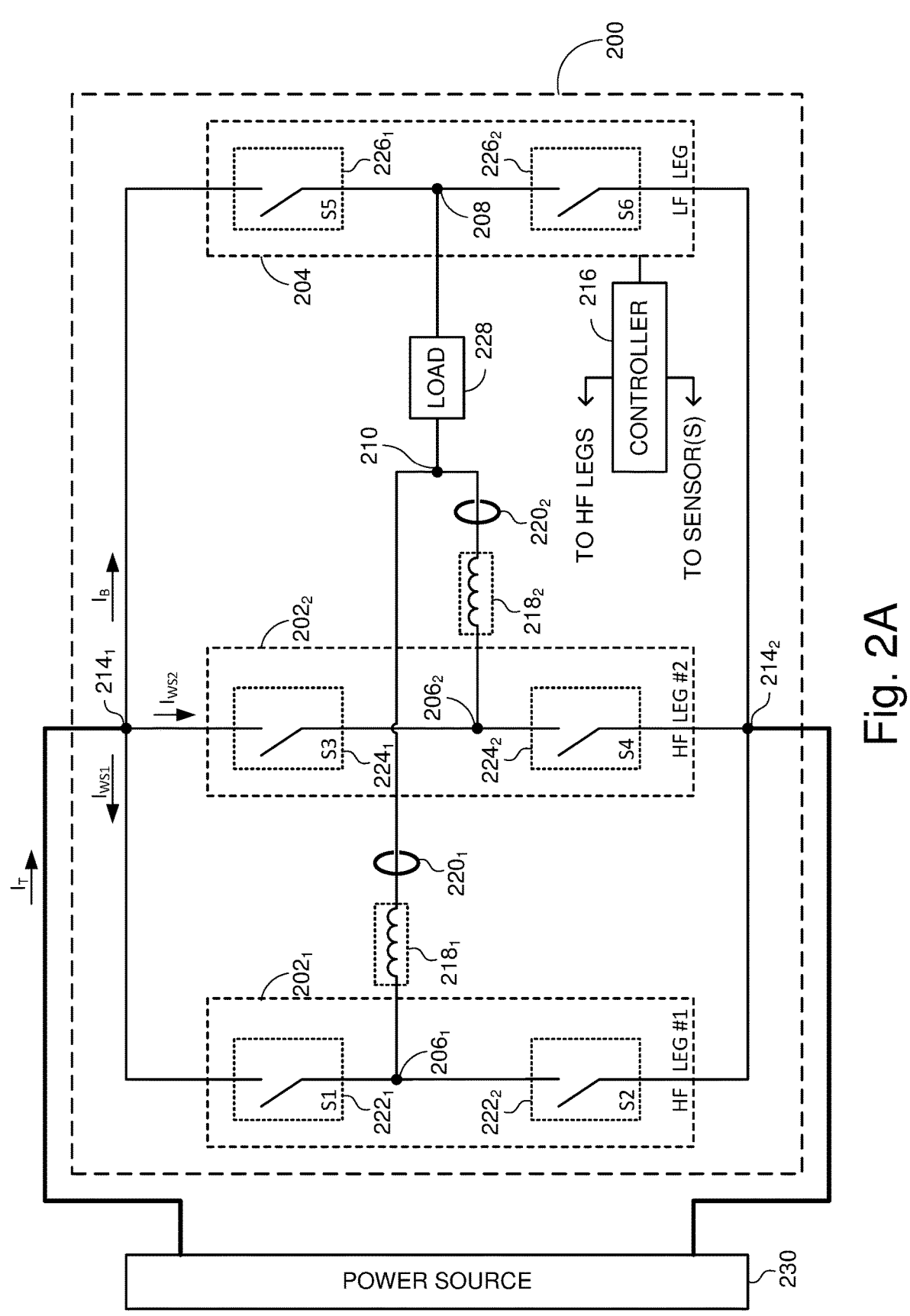
FIG. 2A illustrates an example of a power converter according to aspects of the disclosure herein.
Figures 2B, 2C, 2D, 2E, 2F, 2G:
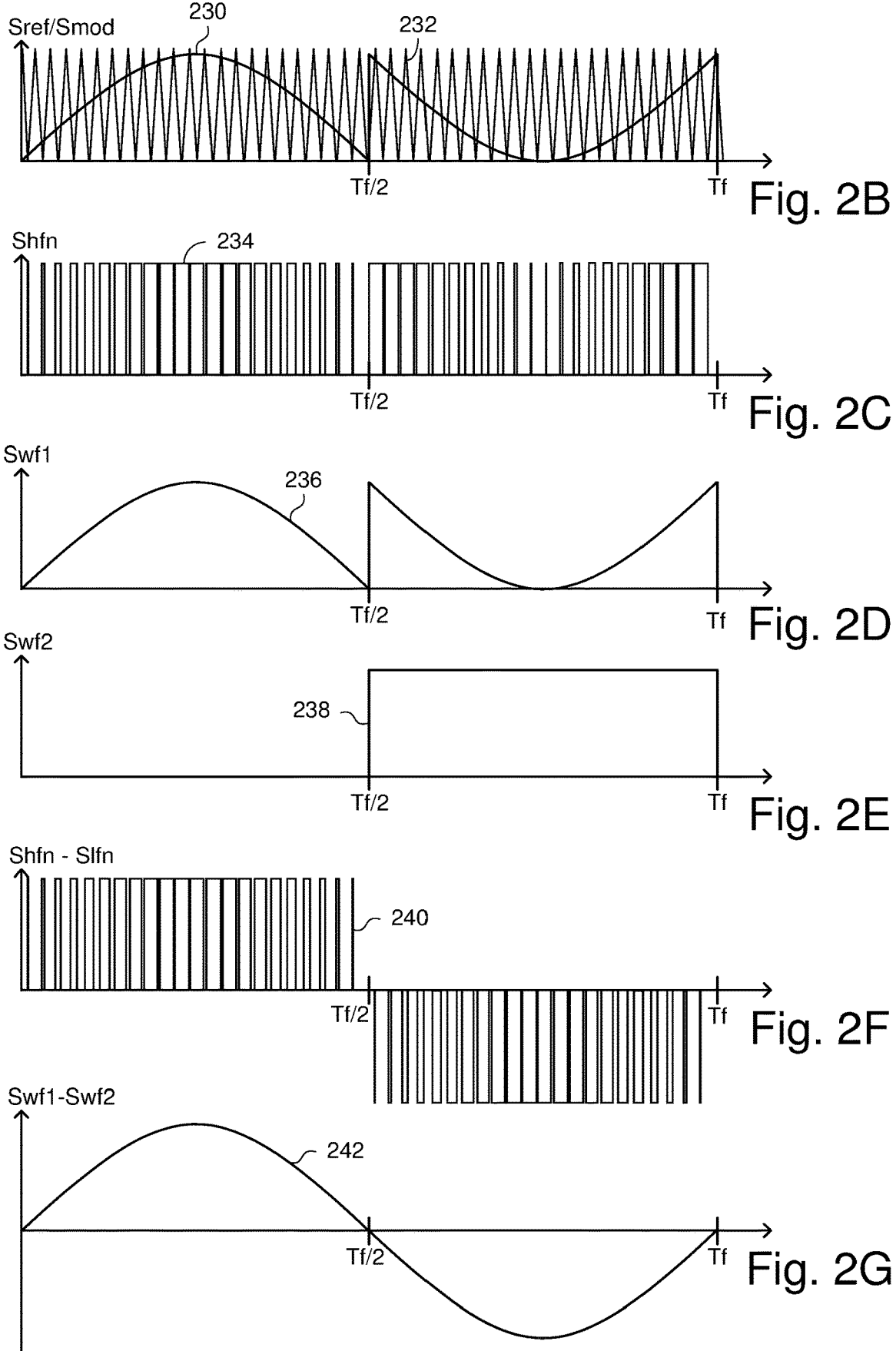
FIG. 2B illustrates an example of a reference waveform and a modulating waveform of a power converter according to aspects of the disclosure herein.
FIG. 2C illustrates an example of pulsed power waveform of a power converter according to aspects of the disclosure herein.
FIG. 2D illustrates an example of a first power waveform of a power converter according to aspects of the disclosure herein.
FIG. 2E illustrates an example of a second power waveform of a power converter according to aspects of the disclosure herein.
FIG. 2F illustrates an example of a PWM power waveform of a power converter according to aspects of the disclosure herein.
FIG. 2G illustrates an example of an AC power waveform of a power converter according to aspects of the disclosure herein.

Controller 116 may control the switches in each of high-frequency switching legs $102_1$, $102_2$, . . . , $102_N$, to switch at a corresponding high-frequency, based on a switching scheme, so as to generate a pulsed power waveform (e.g., as depicted in FIGS. 2C, 3C, and/or 4C), at a corresponding one of high-frequency nodes $106_1$, $106_2$, . . . , $106_N$. The pulsed power waveform may be a pulse width modulation (PWM) signal having two or more levels. The pulsed power waveform may be based on a reference signal (e.g., as depicted in FIGS. 2B, 3B, and/or 4B). The reference signal may be biased at a time or a time interval by a first voltage level. Each one of filters $118_1$, $118_2$, . . . , $118_N$ may filter the pulsed power waveform at the corresponding one of high-frequency nodes $106_1$, $106_2$, . . . , $106_N$, and provide a first power waveform at AC terminal 110. The first power wave from may be biased at the time or the time interval by a second voltage level, corresponding to the first voltage level (e.g., as depicted in FIGS. 2D, 3D, and/or 4D) at AC terminal 110. Controller 116 may control low-frequency switching leg 104 to generate a second power waveform (e.g., as depicted in FIGS. 2E. 3E, and/or 4E) at AC terminal 108. The voltage level or levels of the second power waveform, at the time or the time interval, may correspond to (e.g., be the same as, or proportional to) the second voltage level, which biases the first power waveform. The fundamental frequency of the first power waveform, and the fundamental frequency of the second power waveform may be the same. A load, such as load 122, may be coupled between AC terminal 110 and AC terminal 108. Thus, load 122 may be provided with a difference between the first power waveform at AC terminal 110, and the second power waveform at AC terminal 108. This difference may result in an AC power signal (e.g., as depicted in FIGS. 2G, 3G, and/or 4G).

According to aspects of the disclosure herein, the currents through each of high-frequency nodes $106_1$, $106_2$, . . . , $106_N$ should be balanced. To balance the currents, each one of sensor(s) $120_1$, $120_2$, . . . , $120_N$ may provide to controller 116, a measurement relating to the current through a corresponding one of high-frequency nodes $106_1$, $106_2$, . . . , $106_N$. Controller 116 may detect a differential current between the current flowing through high-frequency nodes $106_1$, $106_2$, . . . , $106_N$. In instances where controller 116 detects a differential current, controller 116 may adjust the switching scheme of one, some, or all of high-frequency switching legs $102_1$, $102_2$, . . . , $102_N$, to balance the currents through high-frequency nodes $106_1, 106_2, \ldots, 106_N$ based on a balancing criterion. For example, controller 116 may adjust the corresponding PWM signal (e.g., the duty cycle of the PWM signal) by controlling one, some or all high-frequency switching legs $102_1, 102_2, \ldots, 102_N$.

Reference is now made to FIGS. 2A-2G, which illustrates an example of a power converter generally referenced 200, and related waveforms, according to aspects of the disclosure herein. Power converter 200 is an example of power converter 100 (FIG. 1). Power converter 200 may comprise two high-frequency switching legs $202_1$ and $202_2$, and a low-frequency switching leg 204, an AC terminal 210, and an AC terminal 208. Power converter 200 may comprise a pair of DC terminals $214_1$ and $214_2$ and a controller 216. Power converter 200 may further comprise two filters $218_1$ and $218_2$, each corresponding to a respective one of high-frequency switching legs $202_1$ and $202_2$. Power converter 200 may further comprise two sensor(s) $220_1$ and $220_2$, each corresponding to a respective one of high-frequency switching legs $202_1$ and $202_2$.

In the example of FIG. 2A, each one of high-frequency switching legs $202_1$ and $202_2$, and low-frequency switching leg 204, may comprise a two level switching leg (e.g., comprising two switches coupled in series). In the example of FIG. 2A, each one of high-frequency switching legs $202_1$ and $202_2$, and low-frequency switching leg 204, is depicted as a half-bridge switching leg. For example, high-frequency switching leg $202_1$ may comprise switch $222_1$ and switch $222_2$ coupled in series at a high-frequency node $206_1$. High-frequency switching leg $202_2$ may comprise switch $224_1$ and switch $224_2$ coupled in series at a high-frequency switching node $206_2$. Low-frequency switching leg 204 may comprise switch $226_1$ and switch $226_2$ coupled in series at AC terminal 208. Each one of switches $222_1, 222_2, 224_1, 224_2, 226_1,$ or $226_2$ may be a field effect transistor (FET), a bipolar junction transistor (BJT), an insulate-gate bipolar transistor (IGBT), a diac, a triac, a silicon controlled rectifier (SCR), or a diode. The series coupling of switches $222_1$ and $222_2$, and thus high-frequency switching leg $202_1$, may be coupled between DC terminals $214_1$ and $214_2$. The series coupling of switches $224_1$ and $224_2$, and thus high-frequency switching leg $202_2$, may be coupled between DC terminals $214_1$ and $214_2$. The series coupling of switches $226_1$ and $226_2$, and thus low-frequency switching leg 204, may be coupled between DC terminals $214_1$ and $214_2$. As such, high-frequency switching legs $202_1$ and $202_N$, or low-frequency switching leg 204, may be coupled (e.g., in parallel) between DC terminals $226_1$ and $226_2$.

Each one of filters $218_1$ and $218_2$ may be similar to filters $114_1, 114_2, \ldots, 114_N$ (FIG. 1), and may be coupled between a corresponding one of high-frequency nodes $206_1$ and $206_2$, and AC terminal 210. Each one of sensor(s) $220_1$ and $220_2$ may be similar to sensor(s) $120_1, 120_2, \ldots, 120_N$ (FIG. 1), and may be coupled between a corresponding one of high-frequency nodes $206_1$ and $206_2$, and AC terminal 210. Controller 216 may be similar to controller 116 (FIG. 1), and may be coupled to switches $222_1$, and $222_2$ of high-frequency switching leg $202_1$, to switches $224_1$ and $224_2$ of high-frequency switching leg $202_2$, or to switches $226_1$, and $222_6$ of low-frequency switching leg 204. Controller 216 may be coupled to each of sensor(s) $220_1$ and $220_2$. A load 228 may be coupled between AC terminal 210, and AC terminal 208.

DC terminals $214_1$ and $214_2$ may be coupled to a power source 230 (e.g., a photovoltaic string, a photovoltaic array, a battery). Power source 230 may provide power at DC terminals $214_1$ and $214_2$. Controller 216 may control switches $222_1$ and $222_2$ of high-frequency switching leg $202_1$, and/or switches $224_1$ and $224_2$ of high-frequency switching leg $202_2$, to transition between an off-state (e.g., non-conducting) and an on-state (e.g., conducting), or vice versa, to generate, at high-frequency nodes $206_1$ and $206_2$, a pulsed power waveform (e.g., pulsed power signal 234— FIG. 2C). Controller 216 may determine the transition between an off-state and an on-state, or vice versa, of switches $222_1, 222_2, 224_1,$ and/or $224_2$ based on a switching scheme. For example, the switching scheme may determine the timing of a transition of each of switches $222_1, 222_2, 224_1$ and/or $224_2$ between states. Controller 216 may determine the switching scheme based on a reference signal such as reference signal 230 (e.g., as shown in FIG. 2B), and a modulating signal 232 (e.g., a triangular wave signal or a saw-tooth wave signal) having a first frequency (e.g., on the order of tens of kilohertz, hundreds of kilohertz, or thousands of kilohertz), which may result in a PWM switching scheme. As such, switches $222_1, 222_2, 224_1$ and/or $224_2$, may transition between an on-state and an off-state, and vice versa, at the first frequency. Nevertheless, it is noted that the switching frequency of switches $222_1$, and $222_2$ may be at the first frequency, and the switching frequency of switches $224_1$, and $224_2$ may be at a second frequency (e.g., based on a modulating signal having the second frequency). Reference signal 230 may be based on another reference signal (e.g., a sine wave based on AC signal from a power distribution network), by biasing the other reference signal at a time or at time interval. For example, reference signal 230 may be biased at a time or a time interval by a first voltage. For example, reference signal 230 is depicted as a sine wave, which may be biased by a first voltage level between time Tf/2 and Tf. Since high-frequency switching legs $202_1$ and $202_2$ may be two level switching legs, in the example of FIGS. 2C, pulsed power waveform 234 is a two-level signal.

Filter $218_1$ filters the pulsed power waveform at node $206_1$, and filter $218_2$ filters the pulsed power waveform at node $206_2$. The output of filter $218_1$ and filter $218_2$ may provide, at AC terminal 210, a first power waveform (e.g., first power waveform 236—FIG. 2D). First power waveform 236 may be biased at a time or a time interval by a second voltage, corresponding to (e.g., be proportional to) the bias of the reference signal. For example, first power waveform 236 is depicted as a sine wave, which may be biased between time Tf/2 and Tf (e.g., similar to reference signal 230, but with different voltage levels). It is noted that, reference signal 230, and first power waveform 236 may have similar forms. However, these signals may have different voltage levels. For example, the voltage level of reference signal 230 may be on the order of a few volts (e.g., 3.3V, 5V, 7.5V, 9V, 10V, 12V, or 15V). The voltage level of first power waveform 236 may be on the order of a tens or hundreds of volts (e.g., 50V, 100V, 300V, 350V, 400V, 500V, 600V, or 800V) or higher.

Controller 216 may control switches $226_1$ and $226_2$ of low-frequency switching leg 204 to transition between an off-state and an on-state, or vice versa, to generate, at AC terminal 208, a second power waveform. The voltage levels of the second power waveform, at the time or the time interval at which the first power waveform is biased, corresponds to the second voltage level, which biases the first power waveform. For example, in FIG. 2E, second power waveform is depicted as a square wave 238. Controller 216 may control switches $226_1$ and $226_2$ based on a switching scheme. Controller 216 may determine the switching scheme based on a reference signal having a third frequency (e.g., the frequency of a power delivery network). For example, if the reference signal is a sine wave based on AC signal from a power distribution network, controller 216 may control switch 226₁ to be in the on-state, and switch 226₂ to be in the off-state during times in which the reference signal is positive (e.g., relative to a reference). Controller 216 may control switch 226₁ to be in the off-state, and switch 226₂ to be in the on-state during times in which the reference signal is negative (e.g., relative to a reference level). As such, controller 216 may control switches 226₁ and 226₂, to transition between an on-state and an off-state, and vice versa, at a third frequency, which may be lower than the first frequency or the second frequency at which controller 216 controls switches 222₁, 222₂, 224₁, and 224₂.

It is noted that the fundamental frequency of reference signal 230, pulsed power waveform 236, and of second power waveform 238 may be the same fundamental frequency. For example reference signal 230, and second power waveform 238 may be generated based on a power signal from a power distribution network (e.g., a power grid). Thus, the frequency of these signals may be the frequency of the power signal (e.g., 50 Hz, or 60 Hz).

In the example of FIGS. 2A-2G, a difference between pulsed power signal 234, and second power waveform 238, may result in a three level PWM power waveform, such as PWM power waveform 240 depicted in FIG. 2F. A difference between the first power waveform 236 at AC terminal 210, and second power waveform 238 at AC terminal 208, may result in an AC power signal 242 depicted in FIG. 2G. Thus, load 228 may receive AC power signal 242.

Reference is now made to FIGS. 3A-3G, which illustrate an example of a power converter generally referenced as power converter 300, and related waveforms, according to aspects of the disclosure herein. Power converter 300 may be an example of power converter 100 (as may be depicted in FIG. 1). In the example of FIGS. 3A-3G, power converter 300 may comprise two high-frequency switching legs 302₁ and 302₂, a low-frequency switching leg 304, an AC terminal 310, and a low-frequency terminal 308. Power converter 300 may comprise three DC terminals 314₁, 314₂, and 314₃, and a controller 316. Power converter 300 may further comprise two filters 318₁ and 318₂, each corresponding to a respective one of high-frequency switching legs 302₁ and 302₂. Power converter 300 may further comprise two sensor (s) 320₁ and 320₂, each corresponding to a respective one of high-frequency switching legs 302₁ and 302₂.

In the example of FIG. 3A, each one of high-frequency switching legs 302₁ and 302₂ may be a three level switching leg, and each may comprise a corresponding high-frequency node 306₁ and 306₂. As such DC terminals 314₁, 314₂, and 314₃ may each correspond to a respective voltage level (e.g., as indicated by the labels "Vsource" and "Vref" and "Vn"). For example, in FIG. 3A, each one of high-frequency switching legs 302₁ and 203₂ is depicted as a T-type neutral point clamped (NPC) switching legs. High-frequency switching leg 302₁ may comprise switches (e.g., FETs) 322₁, 322₂, 324₁, and 324₂. Switches 322₁ and 322₂ are coupled in series (e.g., at high-frequency node 306₁). For example, such as in cases in which switches 322₁ and 322₂ are N-channel FETs, the source of switch 322₁ may be coupled to the drain of switch 322₂ at high-frequency node 306₁. The series coupling of switches 322₁ and 322₂ may be coupled between DC terminals 314₁ and 314₂. Switches 324₁ and 324₂ may be coupled in series between DC terminal 314₃ and high-frequency node 306₁. For example, such as in cases where switches 324₁ and 324₂ are N-channel FETs, the drain of switch 324₁ may be coupled to the drain of switch 324₂.

High-frequency switching leg 302₂ may comprise switches (e.g., FETs) 326₁, 326₂, 328₁, and 328₂. Switches 326₁ and 326₂ may be coupled in series at high-frequency node 306₂. For example, such as in cases where switches 326₁ and 326₂ are N-channel FETs, the source of switch 326₁ may be coupled to the drain of switch 326₂ at high-frequency node 306₁. The series coupling of switches 326₁ and 326₂ may be coupled between DC terminals 314₁ and 314₂ (e.g., as indicated by the labels "Vsource" and "Vref" in FIG. 3A). Switches 328₁ and 328₂ may be coupled in series between DC terminal 314₃ and high-frequency node 306₂. For example, such as in cases where switches 328₁ and 328₂ are N-channel FETs, the drain of switch 328₁ may be coupled to the drain of switch 328₂.

Low-frequency switching leg 304 may be a two level switching leg, and may comprise two switches (e.g., IGBTs) 330₁ and 330₂ coupled in series at a low-frequency terminal 308. For example, such as in cases where 330₁ and 330₂ are IGBTs, the emitter of switch 330₁ may be coupled to the collector of switch 330₂. The series coupling of switches 330₁ and 330₂ may be coupled between DC terminals 314₁ and 314₂. As mentioned above in conjunction with FIG. 2A, each of switches 322₁, 322₂, 324₁, 324₂, 326₁, 326₂, 328₁, 328₂, 330₁, or 330₂ may be a FET, a BJT, an IGBT, a diac, a triac, an SCR, or a diode.

Each one of filters 318₁ and 318₂ may be similar to filters 118₁, 118₂, . . . , 118ₙ (FIG. 1), and may be coupled between a corresponding one of high-frequency nodes 306₁ and 306₂, and AC terminal 310. Each one of sensor(s) 320₁ and 320₂ may be similar to sensor(s) 120₁, 120₂, . . . , 120ₙ (FIG. 1), and may be coupled between a corresponding one of high-frequency nodes 306₁ and 306₂, and AC terminal 310. Controller 316 may be similar to controller 116 (FIG. 1), and may be coupled to each of switches 322₁, 222₂, 324₁ or 324₂ of high-frequency switching leg 302₁ or to each of switches 326₁, 326₂, 328₁, or 328₂ of high-frequency switching leg 302₂. Controller 316 may be coupled with switches 330₁ or 330₂ of low-frequency switching leg 304. Controller 316 may be coupled with each of sensor(s) 320₁ or 320₂. A load 326 may be coupled between first AC terminal 310 and second AC terminal 308.

A power source 332 (e.g., a photovoltaic source, a battery) may generate DC power between DC terminals 314₁ and 314₂. A pair of DC side capacitors 334₁ and 334₂ may be coupled in series at DC terminal 314₃. The series coupling of capacitors 334₁ and 334₂ may be coupled between DC terminals 314₁ and 314₂. The series coupling of capacitors 334₁ and 334₂ may create a capacitive divider, which divides the voltage between DC terminals 314₁ and 314₂ at DC terminal 314₃.

Controller 316 may control switches 322₁, 322₂, 324₁, and/or 324₂ of high-frequency switching leg 302₁, or switches 326₁, 326₂, 328₁, and/or 328₂ of high-frequency switching leg 302₂, to transition between an off-state and an on-state, or vice versa, to generate, at high-frequency nodes 306₁ and 306₂, a pulsed power waveform (e.g., pulsed power waveform 344—FIG. 3C). Controller 316 may control switches 322₁, 322₂, 324₁, and/or 324₂ of high-frequency switching leg 302₁, or switches 326₁, 326₂, 328₁, and/or 328₂ of high-frequency switching leg 302₂ to transition between an off-state and an on-state, or vice versa, based on a switching scheme. Controller 316 may determine the switching scheme, based on a reference signal such as reference signal 340 (as depicted in FIG. 3B), and two modulating signals $342_1$ and $342_2$ (e.g., a triangular wave signal or a saw-tooth wave signal) having a first frequency (e.g., on the order of tens of kilohertz, hundreds of kilohertz, or thousands of kilohertz). As such, switches $322_1$, $322_2$, $324_1$, $324_2$, $326_1$, $326_2$, $328_1$, and/or $328_2$ may transition between an on-state and an off-state, and vice versa, at the first frequency. Alternatively, it is noted that the switching frequency of switches $322_1$, $322_2$, $324_1$, and $324_2$, may be at the first frequency, and the switching frequency of switches $326_1$, $326_2$, $328_1$ and $328_2$ may be at a second frequency (e.g., based on a different modulating signal). Reference signal 340 may be based on another reference signal (e.g., a sine wave based on AC signal from a power distribution network) by biasing the reference signal at a time or at time interval, by a first voltage, similar to as described above with regards to reference signal 230 (as depicted in FIG. 2B). In the example of FIGS. 3A-3G, pulsed power waveform 344 is a three-level signal.

Filter $318_1$ filters the pulsed power waveform at high-frequency node $306_1$, and filter $318_2$ filters the pulsed power waveform at high-frequency node $306_2$. The output of filter $318_1$ and filter $318_2$ provide, at AC terminal 310, first power waveform, such as power waveform signal 346 (as depicted in FIG. 3D). First power waveform 346 may be biased at a time or a time interval by a second voltage. It is noted that, although reference signal 340, and first power waveform 346 may have similar forms, these signals may have different voltage levels (e.g., similar to those described above in conjunction with FIGS. 2A-2G).

Controller 316 may control switches $330_1$ and $330_2$ of low-frequency switching leg 304 to transition between an off-state and an on-state, or vice versa, to generate, at AC terminal 308, a second power waveform. The voltage amplitude (e.g., an amplitude comprising the voltage level) of the second power waveform, at the time or the time interval at which the first power waveform is biased, corresponds to the second voltage level, which biases the first power waveform. For example, in FIG. 3E, a second power waveform is depicted as square wave 348. Controller 316 may control switches $330_1$ and $330_2$ based on a switching scheme. Controller 316 may determine the switching scheme based on a reference signal having a third frequency, similar to as described above in conjunction with FIG. 2A. It is noted that the fundamental frequency of reference signal 330, of pulsed power waveform 334 and of square wave 348 may be the same fundamental frequency (e.g., as describe above in conjunction with FIGS. 2A-2G). As such, controller 316 may control switches $330_1$ and $330_2$ to transition between an on-state and an off-state, or vice versa, at the third frequency.

In the examples of FIGS. 3A-3G, a difference between pulsed power waveform 344 and second power waveform 348 may result in a five level PWM power waveform such as PWM power waveform 350 (as depicted in FIG. 3F). A difference between the first power waveform 346 at AC terminal 310 and the second power waveform 348 at AC terminal 308 may result in an AC power signal 352 depicted in FIG. 3G. Thus, load 326 may receive AC power signal 352.

In the examples of FIGS. 2A-2G and 3A-3G above, the low-frequency switching leg is described as a two-level switching leg (e.g., half bridge). According to the disclosure herein, the low-frequency switching leg may be a multi-level (e.g., neutral point clamped, or flying capacitor) switching leg. Employing a three-level switching leg may reduce switching losses.

Reference is now made to FIGS. 4A-4G, which illustrate an example of a power converter, generally referenced 400, and related waveforms, according to aspects of the disclosure herein, in which the low-frequency switching leg is a multi-level switching leg. Power converter 400 is an example of power converter 100 (FIG. 1). In the example of FIGS. 4A-4G, the power converter 400 may comprise two high-frequency switching legs $402_1$ and $402_2$, a low-frequency switching leg 404, an AC terminal 410, and an AC terminal 408. In the example of FIG. 4A, high-frequency switching legs $402_1$ and $402_2$, and low-frequency switching leg 404, may be multi-level (e.g., three levels) switching legs. Power converter 400 may comprise three DC terminals $414_1$, $414_2$, and $414_3$, and a controller 416. Power converter 400 may further comprise two filters $418_1$ and $418_2$, each corresponding to a respective one of high-frequency switching legs $402_1$ and $402_2$. Power converter 400 may further comprise two sensor(s) $420_1$ and $420_2$, each corresponding to a respective one of high-frequency switching legs $402_1$ and $402_2$.

In the example of FIG. 4A, each one of high-frequency switching legs $402_1$ and $402_2$, may be a three level switching leg, each comprising a corresponding high-frequency switching node $406_1$ and $406_2$. In the example of FIG. 4A, low-frequency switching leg 404 may also be a three level switching leg comprising an AC terminal 408. DC terminals $414_1$, $414_2$, and $414_3$ may each correspond to a respective voltage level (e.g., as indicated by the labels "Vsource" and "Vref" and "Vn"). For example, in FIG. 4A, each one of high-frequency switching legs $402_1$ and $403_2$, and low-frequency switching leg 404, is depicted as a T-type neutral point clamped (NPC) switching legs. High-frequency switching leg $402_1$ may comprise switches (e.g., FETs) $422_1$, $422_2$, $424_1$, or $424_2$. Switches $422_1$ and $422_2$ may be coupled in series (e.g., at high-frequency node $406_1$). If switches $422_1$ and $422_2$ are N-channel FETs, the source of switch $422_1$ may be coupled to the drain of switch $422_2$ at high-frequency node $406_1$. The series coupling of switches $422_1$ and $422_2$ may be coupled between DC terminals $414_1$ and $414_2$. Switches $424_1$ and $424_2$ may be coupled in series between DC terminal $414_3$ and high-frequency node $406_1$. For example, if switches $424_1$ and $424_2$ are N-channel FETs, the drain of switch $424_1$ is coupled to the drain of switch $424_2$.

High-frequency switching leg $402_2$ may comprise switches (e.g., FETs) $426_1$, $426_2$, $428_1$, and/or $428_2$. Switches $426_1$ and $426_2$ may be coupled in series at high-frequency node $406_2$. For example, such as in cases where switches $426_1$ and $426_2$ are N-channel FETs, the source of switch $426_1$ may be coupled to the drain of switch $426_2$ at high-frequency node $406_1$. The series coupling of switches $426_1$ and $426_2$ may be coupled between DC terminals $414_1$ and $414_2$ (e.g., as indicated by the labels "Vsource" and "Vref" in FIG. 4A). Switches $428_1$ and $428_2$ may be coupled in series between DC terminal $414_3$ and high-frequency node $406_2$. For example, if switches $428_1$ and $428_2$ are N-channel FETs, the drain of switch $428_1$ may be coupled to the drain of switch $428_2$.

Low-frequency switching leg 404 may be a multi-level (e.g., three level) switching leg, and may comprise switches (e.g., IGBTs) $430_1$, $430_2$ $432_1$, and/or $432_2$. Switches $430_1$ and $430_2$ may be coupled in series at AC terminal 408. For example, if $430_1$ and $430_2$ are IGBTs, the emitter of switch $430_1$ may be coupled to the collector of switch $430_2$. The series coupling of switches $430_1$ and $430_2$ may be coupled between DC terminals $414_1$ and $414_2$. Switches $432_1$ and $432_2$ may be coupled in series between DC terminal $414_3$ and AC terminal 408. For example, if switches $432_1$ and $432_2$ are IGBTs, the emitter of switch $432_1$ may be coupled to the emitter of switch $432_2$. As mentioned above in conjunction with FIG. 2A or 3A, each of switches $422_1$, $422_2$, $424_1$, $424_2$, $426_1$, $426_2$, $428_1$, $428_2$, $430_1$, $430_2$, $432_2$, and/or $432_2$ may be a FET, a BJT, an IGBT, a diac, a triac, a SCR, or a diode.

Each one of filters $418_1$ and $418_2$ may be similar to filters $118_1$, $118_2$, . . . , $118_N$ (as depicted in FIG. 1), and may be coupled between a corresponding one of high-frequency nodes $406_1$ and $406_2$, and AC terminal 410. Each one of sensor(s) $420_1$ and $420_2$ may be similar to sensor(s) $120_1$, $120_2$, . . . , $120_N$ (as depicted in FIG. 1), and may be coupled between a corresponding one of high-frequency nodes $406_1$ and $406_2$, and AC terminal 410. Controller 416 may be similar to controller 116 (as depicted in FIG. 1), and may be coupled to each of switches $422_1$, $422_2$, $424_1$ and $424_2$ of high-frequency switching leg $402_1$ and to each of switches $426_1$, $426_2$, $428_1$, and $428_2$ of high-frequency switching leg $402_2$. Controller 416 may be coupled with each one of switches $430_1$, $430_2$, $432_1$ or $432_2$ of low-frequency switching leg 404. Controller 416 may be coupled with each of sensor(s) $420_1$ or $420_2$. A load 426 may be coupled between AC terminal 410, and AC terminal 408.

A power source 436 may generate DC power between DC terminals $414_1$ and $414_2$. A pair of DC side capacitors $434_1$ and $434_2$ may be coupled in series at DC terminal $414_3$. The series coupling of capacitors $434_1$ and $434_2$ may be coupled between DC terminals $414_1$ and $414_2$. The series coupling of capacitors $434_1$ and $434_2$ may create a capacitive divider which divides the voltage between DC terminals $414_1$ and $414_2$, at DC terminal $314_3$ at a predetermined ratio.

Controller 416 may control the switches $422_1$, $422_2$, $424_1$, and $424_2$ of high-frequency switching leg $402_1$, and switches $426_1$, $426_2$, $428_1$, and $428_2$ of high-frequency switching leg $402_2$, to transition between an off-state and an on-state, or vice versa, to generate, at high-frequency nodes $406_1$ and $406_2$, a pulsed power waveform (e.g., pulsed power waveform 444, as may be depicted in FIG. 4C). Controller 416 may control switches $422_1$, $422_2$, $424_1$, and $424_2$, and switches $426_1$, $426_2$, $428_1$, and $428_2$, to transition between an off-state and an on-state, or vice versa, based on a switching scheme. Controller 416 may determine the switching scheme, based on a reference signal such as signal 440 (as depicted in FIG. 4B), and two modulating signals $442_1$ and $442_2$ (e.g., a triangular wave signal or a saw-tooth wave signal) having a first frequency (e.g., on the order of tens of kilohertz, hundreds of kilohertz, or thousands of kilohertz). As such, switches $422_1$, $422_2$, $424_1$, $424_2$, $426_1$, $426_2$, $428_1$ and/or $428_2$ may transition between an on-state and an off-state, and vice versa, at the first frequency. Alternatively, it is noted that the switching frequency of switches $422_1$, $422_2$, $424_1$, and $424_2$ may be at the first frequency, and the switching frequency of switches $426_1$, $426_2$, $428_1$ and $428_2$ may be at a second frequency (e.g., based on a modulating signal having the second frequency). Reference signal 440 may be based on another reference signal (e.g., a sine wave based on AC signal from a power distribution network, by biasing sections of the sine wave). For example, reference signal 440 may be biased at a time or a time interval by a first voltage. For example, reference signal 440 is depicted as a sine wave, which may be biased between times T0-T1, T2-T3, and T4-Tf by a first voltage level. Reference signal 400 may be biased between times T3-T4 by a second voltage level. In the example of FIGS. 4A-4G, pulsed power waveform 444 is a three-level signal.

Filter $418_1$ may filter the pulsed power waveform at high-frequency node $406_1$, and filter $418_2$ may filter the pulsed power waveform at high-frequency node $406_2$. The output of filters $418_1$ and filter $418_2$ may provide, at AC terminal 410, a first power waveform, such as first power waveform 446 (as depicted in FIG. 4D). First power waveform 446 may be biased at a time or a time interval by a second voltage, corresponding to the bias of reference signal 440. Similar with the disclosure above regarding FIG. 2A-2G, or 3A-3G, reference signal 430 and first power waveform 446 may have similar forms, but these signals may have different voltage levels.

Controller 416 may control switches $430_1$, $430_2$, $432_1$, and/or $432_2$ of low-frequency switching leg 404 to transition between an off-state and an on-state, or vice versa, which may generate, at AC terminal 408, a second power waveform. The voltage amplitude of the second power waveform, at the time or the time interval at which the first power waveform is biased, may correspond to the second voltage level, which may bias the first power waveform. For example, as depicted in FIG. 4E, the second power waveform may be a modified square wave 448. Controller 416 may determine the switching scheme based on a reference signal having a third frequency (e.g., as may be similar to as discussed above in conjunction with FIG. 2A-2G or 3A-3G). It is noted that the fundamental frequency of reference signal 430 of pulsed power waveform 444 and of second power waveform 448 may be the same fundamental frequency (e.g., as may be described above in conjunction with FIG. 2A-2G, or 3A-3G). As such, switches $430_1$, $430_2$, $432_1$ and $432_2$ may transition between an on-state and an off-state, and vice versa, at the second frequency.

In the example of FIGS. 4A-4G, a difference between pulsed power waveform 444 and second power waveform 448 may result in a five-level PWM signal, such as PWM power waveform 450 that is depicted in FIG. 4F. A difference between the first power waveform 446 at AC terminal 410, and second power waveform 448 at AC terminal 408, may result in an AC power signal 452 depicted in FIG. 4G. Thus, load 426 may receive AC power signal 452.

According to aspects of the disclosure herein, the high-frequency nodes may be coupled to the AC terminal via a coupled inductor. Reference is now made to FIG. 5, which illustrates an example of a power converter, generally referenced 500, according to aspects of the disclosure herein, which employs a coupled inductor. Power converter 500 may comprise two high-frequency switching legs $502_1$ and $502_2$, and a low-frequency switching leg 504. High-frequency switching legs $502_1$ and $502_2$, may comprise a plurality of switches (e.g., as elaborated above in conjunction with FIG. 2A, 3A, or 4A), and a corresponding one of high-frequency nodes $506_1$ and $506_2$. Low-frequency switching leg 504 may comprise a plurality of switches (e.g., as elaborated above in conjunction with FIG. 2A, 3A, or 4A), and an AC terminal 508. Power converter 500 may comprise an AC terminal 510. Power converter may comprise a pair of DC terminals $514_1$ and $514_2$, and a controller 516. Power converter 500 may further comprise a filter 518. Power converter 500 may comprise sensor(s) $520_1$ and $520_2$, each corresponding to a respective one of high-frequency switching legs $502_1$ and $502_2$. Power converter 500 may further comprise sensor(s) $520_3$ and a coupled inductor 512.

Coupled inductor 512 may comprise a first winding $522_1$, comprising a first end $524_1$, and a second end $526_1$. Coupled inductor 512 may further comprise a second winding $522_2$, comprising a first end $524_2$ and a second end $526_2$. First winding $522_1$ and second winding $522_2$ may be wound around a common core 526. The first end $524_1$ of first winding $522_1$ may be coupled to high-frequency node $506_1$. The first end $524_2$ of second winding $522_2$ may be coupled to high frequency node $506_2$. Second end $526_1$ of first winding $522_1$ may be coupled to the second end $526_2$ of second winding $522_2$ at a node $511$.

High-frequency switching legs $502_1$ and $502_2$, and low-frequency switching leg $504$, may be coupled (e.g., in parallel) between DC terminals $515_1$ and $515_2$, as indicated by the labels 'Vsource' and 'Vref' in FIG. 5. Filter $518$ may be similar to filters $118_1$, $118_2$, ..., $118_N$ (as illustrated in FIG. 1), and be coupled between node $511$ and AC terminal $510$. In the example of FIG. 5, filter $518$ may comprise at least a capacitor $519$. Nevertheless, it is noted that the filtering function may be partially performed by the coupled inductor $512$ (e.g., since coupled inductor $512$ may have leakage inductance). Sensor(s) $520_1$, $520_2$ and $520_3$ may be similar to sensor(s) $120_1$, $120_2$, ..., $120_N$ (as described in FIG. 1). Sensor(s) $520_1$ may be coupled between high-frequency switching leg $506_1$ and first end $524_1$ of first winding $522_1$. Sensor(s) $520_2$ may be coupled between high-frequency switching leg $506_2$ and first end $524_2$ of first winding $522_2$. Sensor(s) $520_3$ may be coupled between node $511$ and AC terminal $510$. Controller $516$ may be similar to controllers $116$, $216$, $316$, or $416$ described above in conjunction with FIGS. 1, 2A, 3A, 4A respectively. Controller $516$ may be coupled to each of high-frequency switching legs $502_1$, and $502_2$ (e.g., as indicated by the label "TO HF LEGS" in FIG. 5), to low-frequency switching leg $504$, and to each of sensor(s) $520_1$, and $520_2$, (e.g., as may be indicated by the label "TO SENSORS" in FIG. 5). A load $530$ may be coupled between AC terminal $510$, and AC terminal $508$.

Controller $516$ may control each one of high-frequency switching legs $502_1$ and $502_2$, based on a switching scheme, to generate a pulsed power waveform (e.g., as described above in conjunction with FIG. 2C, 3C, or 4C) at a corresponding one of high-frequency nodes $506_1$ or $506_2$. Controller $516$ may control high-frequency switching leg $502_1$ to generate a first pulsed power waveform at high-frequency nodes $506_1$. Controller $516$ may control high-frequency switching leg $502_2$ to generate a second power waveform at high-frequency node $506_2$, such that the phase of second pulsed power waveform is shifted relative to the phase of the first pulsed power waveform by a determined phase shift. For example, controller $516$ may determine a phase-shift between the first pulsed power waveform and the second pulsed power waveform to control the ripple current at node $511$. For example, controller $516$ may receive measurements relating to the voltage, the current, or both voltage and current, from sensor(s) $520_1$, $520_2$, and $520_3$. Controller $516$ may determine phase shift between the first pulsed power waveform and the second pulsed power waveform based on the measurements from sensor(s) $520_1$ and $520_2$. Controller $516$ may determine the current ripple based on the measurement or measurements from sensor(s) $520_3$. Controller $516$ may adjust the switching scheme of high-frequency switching leg $502_1$, $502_2$, or of both high-frequency switching legs $502_1$ and $502_2$, so as to control the ripple current at node $511$. For example, controller $516$ may adjust the phase between the modulating signals used to determine the switching schemes of high-frequency switching legs $502_1$ and $502_2$.

Filters $518$ may filter the ripple current at node $511$ and provide a first power waveform (e.g., as depicted in FIGS. 2D, 3D, and/or 4D) at AC terminal $510$. Similar to the description above (e.g., in conjunction with FIGS. 1, 2A-2G, 3A-3G, and/or 4A-4G), controller $516$ may control low-frequency switching leg $504$ to generate a second power waveform (e.g., a square wave depicted in FIG. 2E or 3E) at AC terminal $508$. A load, such as load $530$, may be coupled between AC terminal $510$ and AC terminal $508$. Thus, load $530$ may be provided with a difference between the first power waveform at AC terminal $510$ and the second power waveform at AC terminal $508$. This difference may result in an AC power signal (e.g., as depicted in FIGS. 2G, 3G, and/or 4G).

A multi-phase apparatus (e.g., a three-phase apparatus), may comprise a corresponding power converter (e.g., depicted as power converter $100$—FIG. 1, power converter $200$—FIG. 2A, power converter $300$—FIG. 3A, power converter $400$—FIG. 4A, and/or power converter $500$—FIG. 5A) that may be used for each phase. FIG. 6 may illustrate an example of a three-phase apparatus, generally referenced to as apparatus $600$, according to aspects the disclosure herein. Apparatus $600$ may comprise three power converters $602_1$, $602_2$, and $602_3$, each corresponding to a respective phase of a 3-phase load, such as power distribution network $628$. Power converter $601_1$ may correspond to phase-1, power converter $601_2$ may correspond to phase-2, and power converter $601_3$ may correspond to phase-3. Each of power converters $601_1$, $601_2$, and $601_3$ may be similar to power converter $100$ (as depicted in FIG. 1), to power converter $200$ (as depicted in FIG. 2A), to power converter $300$ (as depicted in FIG. 3A), to power converter $400$ (as may be depicted in FIG. 4A), or to power converter $500$ (as depicted in FIG. 5).

Each power converter of power converters $601_1$, $601_2$, and $601_3$ may comprise a corresponding plurality of high-frequency switching legs, and a corresponding low-frequency switching leg. Power converter $601_1$ may comprise high-frequency switching legs $602_{11}$, high-frequency switching leg $602_{12}$, and low-frequency switching leg $604_1$. Power converter $601_2$ may comprise high-frequency switching legs $602_{21}$, high-frequency switching leg $602_{22}$, and low-frequency switching leg $604_2$. Power converter $601_3$ may comprise high-frequency switching legs $602_{31}$, high-frequency switching leg $602_{32}$, and low-frequency switching leg $604_3$. Each high-frequency switching leg may comprise a corresponding high-frequency node, and each low-frequency switching leg may comprise a corresponding AC terminal. High-frequency switching leg $602_{11}$ may comprise high-frequency node $606_{11}$, high-frequency switching leg $602_{12}$ may comprise high-frequency switching node $606_{12}$, and low-frequency switching leg $604_1$ may comprise AC terminal $608_1$. High-frequency switching leg $602_{21}$ may comprise high-frequency node $606_{21}$, high-frequency switching leg $602_{22}$ may comprise high-frequency node $606_{22}$, and low-frequency switching leg $604_1$ may comprise AC terminal $608_2$. High-frequency switching leg $602_{31}$ may comprise high-frequency node $606_{31}$, high-frequency switching leg $602_{32}$ may comprise high-frequency node $606_{32}$, and low-frequency switching leg $604_3$ may comprise AC terminal $608_3$.

Each power converter of power converters $601_1$, $601_2$, and $601_3$ may comprise a corresponding two AC terminals. Power converter $601_1$ may comprise a corresponding AC terminal $610_1$ and AC terminal $608_1$. Power converter $601_2$ may comprise AC terminal $610_2$ and AC terminal $608_2$. Power converter $601_3$ may comprise AC terminal $610_3$ and AC terminal $608_3$. Each one of power converters $601_1$, $601_2$, and $601_3$ may comprise corresponding filters, and corresponding sensor(s). Power converter $601_1$ may comprise filters $614_{11}$, and $614_{12}$, and sensor(s) $616_{11}$, and $616_{12}$. Power converter $601_2$ may comprise filters $614_{21}$, and $614_{22}$, and sensor(s) $616_{21}$ and $616_{22}$. Power converter $601_3$ may comprise filters $614_{31}$, and $614_{32}$, and sensor(s) $616_{31}$ and $616_{32}$.

Apparatus 600 may further comprise a controller 618, and a transformer 620 (e.g., a 3-phase transformer). Transformer 620 may comprise three converter-side windings $622_1$, $622_2$, and $622_3$, and three corresponding network-side windings $624_1$, $624_2$, and $624_3$. Converter-side winding $622_1$ and network-side winding $624_1$ may be wound around a core leg $626_1$. Converter-side winding $622_2$ and network-side winding $624_2$ may be wound around a core leg $626_2$. Converter-side winding $622_3$ and network-side winding $624_3$ may be wound around a core leg $626_3$. Core legs $626_1$, $626_2$, and $626_3$ may be separate core legs or three legs in a common core. Network-side windings $624_1$, $624_2$, and $624_3$ may be coupled in a star configuration or a delta configuration. In the example in FIG. 6, network-side windings $624_1$, $624_2$, and $624_3$ are connected in a star configuration, which may include a neutral node 630, and each of network-side windings $624_1$, $624_2$, and $624_3$ may further be connected to a corresponding phase of a power distribution network 628.

Each one of filters $614_{11}$, $614_{12}$, $614_{21}$, $614_{22}$, $614_{31}$, and $614_{32}$ may be coupled between a corresponding one of high-frequency node, $606_{11}$, $606_{12}$, $606_{21}$, $606_{22}$, $606_{31}$, or $606_{32}$, and a corresponding AC terminal $610_1$, $610_2$, and $610_3$. Each one of sensor(s) $616_{11}$, $616_{12}$, $616_{21}$, $616_{22}$, $616_{31}$, and $616_{32}$ may be coupled between a corresponding one of high-frequency node, $606_{11}$, $606_{12}$, $606_{21}$, $606_{22}$, $606_{31}$, or $606_{32}$, and a corresponding AC terminal $610_1$, $610_2$, and $610_3$. Controller 616 may be coupled to each one of power converters $601_1$, $601_2$, and $601_3$ (e.g., the same or similar to the description above in conjunction with FIGS. 1, 2A, and/or 3A) as indicated by the labels "TO CONVERTER $601_1$", "TO CONVERTER $601_2$" and "TO CONVERTER $601_3$" in FIG. 6. Converter-side winding $622_1$ may be coupled between AC terminal $610_1$ and AC terminal $608_1$. Converter-side winding $622_2$ may be coupled between AC terminal $610_2$ and AC terminal $608_2$. Converter-side winding $622_3$ may be coupled between AC terminal $610_3$ and AC terminal $608_3$.

Each one of power converters $601_1$, $601_2$, and $601_3$ may operate similar to the description above in conjunction with FIGS. 1, 2A-2G, 3A-3G, and/or 4A-4G. Nevertheless, the phases of the reference signals corresponding to first power converter $601_1$ and second power converter $601_2$, and the phase of the second power waveform corresponding to first power converter $601_1$ and second power converter $601_2$, may be shifted by 120 degrees, one with respect to the other. Similarly, the phases of the reference signals corresponding to second power converter $601_2$ and third power converter $601_3$ and the phase of the second power waveforms corresponding to first power converter $601_2$ and the second power converter $601_3$, may be shifted by 120 degrees, one with respect to the other.

It is noted that high-frequency switching legs $602_{11}$, $602_{12}$, $602_{21}$, $602_{22}$, $602_{31}$, and/or $602_{32}$ may be connected to the same DC terminals (e.g., Vsource, Vref, or Vn). For example, if high-frequency switching legs $602_{11}$, $602_{12}$, $602_{21}$, $602_{22}$, $602_{31}$, or $602_{32}$ are two-level switching legs (e.g., high-frequency switching legs $202_1$ or $202_2$ in FIG. 2), then high-frequency switching legs $602_{11}$, $602_{12}$, $602_{21}$, $602_{22}$, $602_{31}$, and $602_{32}$ may be connected between Vref, and Vsource. If high-frequency switching legs $602_{11}$, $602_{12}$, $602_{21}$, $602_{22}$, $602_{31}$, and/or $602_{32}$ are three-level switching legs (e.g., high-frequency switching legs $302_1$ or $302_2$ in FIG. 3A), then high-frequency switching legs $602_{11}$, $602_{12}$, $602_{21}$, $602_{22}$, $602_{31}$, or $602_{32}$ may be connected to the same three DC terminals Vref, Vsource, and Vn. Similarly, low-frequency switching legs $604_1$, $604_2$, and $604_3$ may be connected to the same DC terminals (e.g., Vsource, Vref, or Vn). For example, if low-frequency switching legs $604_1$, $604_2$, and $604_3$ are two-level switching legs (e.g., low-frequency switching leg $204_1$ or $204_2$ in FIG. 2A, or low-frequency switching legs $304_1$, or $304_2$ in FIG. 3A), then low-frequency switching legs $604_1$, $604_2$, and $604_3$ may be connected between Vref, and Vsource. If low-frequency switching legs $604_1$, $604_2$, and $604_3$ are three-level switching legs (e.g., low-frequency switching legs $404_1$ or $404_2$ in FIG. 4A), then low-frequency switching legs $604_1$, $604_2$, and $604_3$ may be connected to the same three DC terminals Vref, Vsource, and Vn.

In the description of FIG. 6 above, a three-phase apparatus according to the disclosure may be described as being constructed from three power converters, one for each phase. According to the disclosure herein, a three-phase apparatus may be implemented by employing two or more 3-phase inverters, and a corresponding low-frequency switching leg for each phase. Reference is now made to FIG. 7, which is a schematic illustration of an apparatus, generally referenced as apparatus 700, employing two 3-phase inverters, according to aspects of the disclosure herein. In the example of FIG. 7, apparatus 700 may comprise 3-phase inverter $701_1$, 3-phase inverter $701_2$, and low-frequency switching legs $704_1$, $704_2$, and $704_3$. Apparatus 700 may further comprise a controller 718, and a transformer 720. Apparatus 700 may comprise AC terminals $710_1$, $710_2$, and $710_3$, each corresponding to a respective phase.

3-phase inverter $701_1$ may comprise high-frequency switching legs $702_{11}$, $702_{12}$, and $702_{13}$, and high-frequency nodes $706_{11}$, $706_{12}$, and $706_{13}$, each corresponding to a respective one of high-frequency switching legs $702_{11}$, $702_{12}$, or $702_{13}$. 3-phase inverter $701_1$ may comprise filters $714_{11}$, $714_{12}$, and $714_{13}$, each corresponding to a respective one of high-frequency switching legs $702_{11}$, $702_{12}$, or $702_{13}$. 3-phase inverter $701_1$ may comprise sensors $716_{11}$, $716_{12}$, and $716_{13}$, each corresponding to a respective one of high-frequency switching legs $702_{11}$, $702_{12}$, or $702_{13}$.

3-phase inverter $701_2$ may comprise high-frequency switching $702_{21}$, $702_{22}$, and $702_{23}$, and high-frequency nodes $706_{21}$, $706_{22}$, and $706_{23}$, each corresponding to a respective one of high-frequency switching legs $702_{21}$, $702_{22}$, or $702_{23}$. 3-phase inverter $701_2$ may comprise filters $714_{21}$, $714_{22}$, and $714_{23}$, each corresponding to a respective one of high-frequency switching legs $702_{21}$, $702_{22}$, or $702_{23}$. 3-phase inverter $701_2$ may comprise sensors $716_{21}$, $716_{22}$, and $716_{23}$, each corresponding to a respective one of high-frequency switching legs $702_{21}$, $702_{22}$, or $702_{23}$.

Either one, some, or all of high-frequency switching legs $702_{11}$, $702_{12}$, $702_{13}$ $702_{21}$, $702_{22}$, and $702_{23}$, may be similar to high-frequency switching legs $102_1$-$102_N$ (FIG. 1), high-frequency switching legs $202_1$-$202_2$ (as depicted in FIG. 2A), high-frequency switching legs $302_1$-$302_2$ (as depicted in FIG. 3A), high-frequency switching legs $402_1$-$402_2$ (as depicted in FIG. 4A), or high-frequency switching legs $506_1$-$506_2$ (as depicted in FIG. 5). Either one, some, or all of low-frequency switching legs $704_1$, $704_2$, and $704_3$, may be similar to low-frequency switching leg 104 (as depicted in FIG. 1), low-frequency switching leg 204 (as depicted in FIG. 2A), low-frequency switching leg 304 (as depicted in FIG. 3A), low-frequency switching leg 404 (as depicted in FIG. 4A), or low-frequency switching leg 504 (as may be depicted in FIG. 5). Controller 718 may control high-frequency switching legs $702_{11}$, $702_{12}$, $702_{13}$ $702_{21}$, $702_{22}$, and $702_{23}$, and/or low-frequency switching legs $704_1$, $704_2$, and $704_3$ similar to as described above in conjunction with FIGS. 1, 2A-2G, 3A-3G, 4A-4G, 5, and 6.

Transformer 720 may comprise three converter-side windings 722₁, 722₂, and 722₃, and three corresponding network-side windings 724₁, 724₂, and 724₃. Converter-side winding 722₁ and network-side winding 724₁ may be wound around a core leg 726₁. Converter-side winding 722₂ and network-side winding 724₂ may be wound around a core leg 726₂. Converter-side winding 722₃ and network-side winding 724₃ may be wound around a core leg 726₃. Core legs 726₁, 726₂, and 726₃ may be separate core legs or may be three legs in a common core. Network-side windings 724₁, 724₂, and 724₃ may be coupled in a star configuration or a delta configuration. In the example in FIG. 4, network-side windings 724₁, 724₂, and 724₃ are shown as connected in a star configuration, which may include a neutral node 730, and each of network-side windings 724₁, 724₂, and 724₃ may be connected to a corresponding phase of a power distribution network 728.

Each one of filters 714₁₁, 714₁₂, 714₁₃, 714₂₃, 714₂₂, and 714₂₃ may be similar to filter 118₁-118_N (as depicted in FIG. 1) and may be coupled between a corresponding one of high-frequency nodes, 706₁₁, 706₁₂, 706₂₁, 706₂₂, 706₃₁, and 706₃₂, and a corresponding AC terminal 710₁, 710₂, and 710₃. Each one of sensor(s) 716₁₁, 716₁₂, 716₁₃, 716₂₁, 716₂₂, and 716₂₃ may be similar to sensor(s) 120₁-120_N (FIG. 1), and may be coupled between a corresponding one of high-frequency nodes, 706₁₁, 706₁₂, 706₁₃, 706₂₁, 706₂₂, and 706₂₃, and a corresponding one of AC terminals 710₁, 710₂, and 710₃. Controller 716 may be coupled to each one of power converters 701₁, 701₂, (e.g., similar to as described above in conjunction with FIG. 1, 2A, 3A, 4A, or 5) as indicated by the labels "TO 701₁", and "TO CONVERTER 701₂" in FIG. 7. Converter-side winding 722₁ may be coupled between AC terminal 710₁ and AC terminal 708₁. Converter-side winding 722₂ may be coupled between AC terminal 710₂ and AC terminal 708₂. Converter-side winding 722₃ may be coupled between AC terminal 710₃ and AC terminal 708₃.

In the example of FIG. 7, high-frequency switching leg 702₁₁, high-frequency switching leg 702₂₁, and low-frequency switching leg 708₁ may operate as a power converter according to the disclosure herein (e.g., as depicted by power converter 100—FIG. 1, power converter 200—FIGS. 2A-2G, power converter 300—FIGS. 3A-3G, power converter 400—FIGS. 4A-4G, or power converter 500—FIG. 5). High-frequency switching leg 702₁₁, high-frequency switching leg 702₂₁, and low-frequency switching leg 708₁ may correspond to a first phase. Similarly, high-frequency switching leg 702₁₂, high-frequency switching leg 702₂₂, and low-frequency switching leg 708₂ may operate as a power converter according to the disclosure herein, and may correspond to a second phase. High-frequency switching leg 702₁₃, high-frequency switching leg 702₂₃, and low-frequency switching leg 708₃ may also be regarded as a power converter according to the disclosure herein, and correspond to a third phase. Thus, apparatus 700 may generate a 3-phase power signal.

In the example brought hereinabove in conjunction with FIGS. 6 and 7, each power converter 601₁, 601₂, or 601₃, or each 3-phase inverter 701₁ or 701₂, may comprise DC side capacitor or capacitors across the DC terminals thereof (e.g., as shown by DC side capacitors 334₁ and 334₂—FIG. 3A, and/or DC side capacitors 434₁ and 434₂—FIG. 4A). Although the first power waveform at the AC terminal (e.g., AC terminal 610, or AC terminal 720) may not necessarily be a sine wave, the ripple current through the DC side capacitor or capacitors may still be similar to the case of a sine wave at the AC terminal (e.g., a 150 Hz ripple in case of a 50 Hz sine wave at the AC terminal).

According to the disclosure herein, the plurality of high-frequency switching legs may be controlled by one controller, and the low-frequency switching leg may be controlled by another controller. These controllers may or may not be synchronized (e.g., may not receive the same clock signal). The controllers may employ the same reference signal to generate the reference signal and the second power waveform. In such a case, the rise or fall instances of the first power waveform may be different from the corresponding rise or fall instances of the second power waveform. This difference in the corresponding rise or fall instances may result in artifacts in the AC power signal (e.g., as may be further explained below). Reference is now made to FIGS. 8A-8E, which may illustrate examples of timing diagrams according to aspects of the disclosure herein. FIG. 8A shows a first waveform signal 800. FIG. 8B shows a second power waveform 802. Figured 8C shows an AC power waveform 804 which may result from the difference between first power waveform 800 and second power waveform 802. As shown in FIGS. 8A-8E, first power waveform 800 may rise at a time instance Tf/2, and may fall at a time instance Tf. A second power waveform 802 may rise before time instance Tf/2, and may fall before time instance Tf (e.g., due to the lack of synchronization between the controller controlling the high-frequency switching legs, and the controller controlling the low-frequency switching leg). This difference may result in an artifact (e.g., which may be referred to as a "zero-crossing artifact"), such as artifact 806 in AC power waveform 804, which may be around time instance Tf/2. An artifact, such as artifact 806, may contribute to the total harmonic distortion (THC) of AC power waveform 804.

The controller may control the low-frequency switching leg. A rise time, and a fall time may be introduced to the second power waveform. This may have the benefit of reducing the effect of the lack of synchronization between the controller controlling the high-frequency switching legs. FIG. 8D shows second power waveform 808, which may comprise a rise time, $\Delta T_1$, and a fall time, $\Delta T_2$. FIG. 8E shows an AC power waveform 810 which may result from the difference between first power waveform 800, and second power waveform 808, in which the zero-crossing artifact has been reduced.

Reference is now made to FIGS. 9A, 9B, and 9C, which illustrate examples of methods related to the operation of a power converter, according to aspects of the disclosure herein. The methods in FIGS. 9A, 9B, and 9C relate to the operation of a power converter (e.g., as shown by power converter 100—FIG. 1, power converter 200—FIG. 2A, power converter 300—FIG. 3A, power converter 400—FIG. 4A, power converter 500—FIG. 5, power converters 601₁, 601₂, or 601₃—FIG. 6, 3-phase inverters 701₁, or 701₂—FIG. 7) according to the disclosure herein.

FIG. 9A relates to a method for generating an AC power waveform according to the disclosure herein. In step 900, a plurality of high-frequency switching legs (e.g., as shown by high-frequency switching legs 102₁, 102₂, . . . , 102_N—FIG. 1) may generate, at a first AC terminal (e.g., as shown by first AC terminal 110—FIG. 1), a first power waveform (e.g., as shown by first power waveform 236—FIG. 2D, first power waveform 346—FIG. 3D, and/or first power waveform 446—FIG. 4D). For example, such as with reference to FIGS. 2A-2G, high-frequency switching legs 202₁ and 202₂ may generate a first power waveform 236 at a first AC terminal 210. In another example, such as with reference to FIGS. 3A-3G, high-frequency switching legs $302_1$ and $302_2$ may generate a first power waveform 346 at a first AC terminal 310. In another example, such as with reference to FIGS. 4A-4G, high-frequency switching legs $402_1$ and $402_2$ may generate a first power waveform 446 at a first AC terminal 410.

In step 902, a low-frequency switching leg (e.g., as shown by low-frequency switching leg 104—FIG. 1) may generate, at a second AC terminal (e.g., as shown by second AC terminal 108—FIG. 1), a second power waveform (e.g., as shown by second power waveform 238—FIG. 2E, second power waveform 348—FIG. 3E, or second power waveform 448—FIG. 4E). For example, such as with reference to FIG. 2A-2G, a low-frequency switching leg 204 may generate a second power waveform 238 at a second AC terminal 208. In another example, such as with reference to FIGS. 3A-3G, a low-frequency switching leg 304 may generate a second power waveform 348 at second AC terminal 308. In another example, such as with reference to FIGS. 4A-4G, a low-frequency switching leg 404 may generate a second power waveform 448 at a second AC terminal 410.

FIG. 9B relates to a method for operating a high-frequency switching leg according to the disclosure herein. With reference to FIG. 9B, in step 910, a controller (e.g., as shown by controller 116 in FIG. 1) may determine a first switching scheme for a plurality of switches in a high-frequency switching leg, of a first plurality high-frequency switching legs of a power converter. The first switching scheme may be based on a reference signal and a modulating signal. For example, with reference to FIGS. 2A and 2B, controller 216 may determine a switching scheme for switches $222_1$, $222_2$, $224_1$, and/or $224_2$ based on reference signal 230 and modulating signal 232. In another example, with reference to FIGS. 3A and 3B, controller 316 may determine a switching scheme for switches $322_1$, $322_2$, $324_1$, $324_2$, $326_1$, $326_2$, $328_1$, and/or $328_2$, based on reference signal 340 and modulating signals $342_1$ and $342_2$. In another example, with reference to FIGS. 4A and 4B, controller 416 may determine a switching scheme for switches $422_1$, $422_2$, $424_1$, $424_2$, $426_1$, $426_2$, $428_1$, and/or $428_2$, based on reference signal 440 and modulating signals $442_1$ and $442_2$.

In step 912, the controller may control the first plurality of switches in the high-frequency switching leg to transition between an on-state and an off-state at a first frequency, based on the determined switching scheme, to generate a pulsed power waveform at a node of the high-frequency switching leg. For example, with reference to FIG. 2A, controller 216 may control switches $222_1$, $222_2$, $224_1$, or $224_2$ to transition between an on-state and an off-state at a first frequency, based on the determined switching scheme, to generate a pulsed power waveform (e.g., a pulse power signal 234—FIG. 2C) at high-frequency node $206_1$, or $206_2$. In another example, controller 316 may control switches $322_1$, $222_2$, $324_1$, $324_2$, $326_1$, $326_2$, $328_1$, or $328_2$, to transition between an on-state and an off-state at a first frequency, based on the determined switching scheme, to generate a pulsed power waveform 344—FIG. 3C) at high-frequency node $306_1$, or $306_2$. In another example, Controller 416 may control switches $422_1$, $422_2$, $424_1$, $424_2$, $426_1$, $426_2$, $428_1$, or $428_2$, to transition between an on-state and an off-state at a first frequency, based on the determined switching scheme, to generate a pulsed power waveform 444—FIG. 4C) at high-frequency node $406_1$, or $406_2$.

In step 914, the controller may filter the pulsed power waveform to generate a first power waveform at a first AC terminal. For example, with reference to FIG. 1, filters $118_1$, $118_2$, . . . , $118_N$, may filter the pulsed power waveform at the corresponding high-frequency nodes $106_1$, $106_2$, . . . , $106_N$, to generate a first power waveform at AC terminal 110. In another example, with reference to FIGS. 2A-2G, filters $218_1$, and $218_2$ may filter the pulsed power waveform 234 at the corresponding high-frequency nodes $206_1$ and $206_2$ to first power waveform 236 at AC terminal 210. In another example, with reference to FIGS. 3A-3G, filters $318_1$ and $318_2$ may filter the pulsed power waveform at the corresponding high-frequency nodes $306_1$ and $306_2$, to generate first power waveform 346 at AC terminal 310. In another example, with reference to FIGS. 4A-4G, filters $418_1$ and $418_2$ may filter the pulsed power waveform at the corresponding high-frequency nodes $406_1$ and $406_2$, to generate first power waveform 446 at AC terminal 310.

FIG. 9C relates to a method for operating a low-frequency switching leg according to the disclosure herein. In step 920, the controller may determine, based on a reference signal, a switching scheme for a second plurality of switches of a low-frequency switching leg of a power converter. The reference signal may be based on a power signal of a power delivery network (e.g., a power grid). For example, with reference to FIGS. 2A and 2B, controller 216 may determine a switching scheme for one or more of switches $226_1$, and $222_6$, based on reference signal 240. In another example, with reference to FIGS. 3A and 3B, controller 316 may determine a switching scheme for one or more of switches $330_1$, and $330_2$, based on reference signal 340. In another example, with reference to FIGS. 4A and 4B, controller 416 may determine a switching scheme for one or more of switches $430_1$, $430_2$, $432_1$ and $432_2$, based on a reference signal 440.

In step 922, the controller may control the second plurality of switches of the low-frequency switching leg, to transition between an on-state and an off-state at a second frequency, based on the switching scheme, to generate a second power waveform at an AC terminal of the power converter. For example, with reference to FIGS. 2A and 2E, controller 216 may control one or more of switches $226_1$, and $222_6$ to transition between an on-state and an off-state at a second frequency, to generate second power waveform 238, at AC terminal 208. In another example, with reference to FIGS. 3A and 3E, controller 316 may control one or more of switches $330_1$, and $330_6$ to transition between an on-state and an off-state at a second frequency, to generate second power waveform 348, at AC terminal 308. In another example, with reference to FIGS. 4A and 4E, controller 416 may control one or more of switches $430_1$, $430_2$, $432_1$ and $432_2$, to transition between an on-state and an off-state at a second frequency, to generate second power waveform 348, at AC terminal 308.

The power converters according to the disclosure herein include a plurality of high-frequency switching legs coupled in parallel to each other, and to a low-frequency switching leg. As mentioned above, the switches of the high-frequency switching legs are controlled to transition between states at a high frequency. The switches of the low-frequency switching leg are controlled to transition between states at a low frequency, which may be lower than the high frequency. Employing a plurality of parallel high-frequency switching legs switching in phase, may allow to employ switches with lower current ratings at each leg. For example, with reference to FIG. 2A, switches $222_1$ and $224_1$ may transition between states in phase, and switches $222_2$ and $224_2$ may transition between states in phase. Thus, the current flowing through each of high-frequency switching legs $202_1$, and $202_2$, (e.g., $I_{WS1}$ and $I_{WS2}$), may be half of the difference between the total current flowing into power converter 200 ($I_T$), and the current flowing into low-frequency switching leg 204 ($I_B$). In the case of N high-frequency switching legs, which switch in-phase, the current through each high-frequency switching leg may be 1/N of the difference between the total current flowing into the power converter, and the current flowing into the low-frequency switching leg.

Employing a plurality of parallel high-frequency switching legs may allow a reduction in the switching frequency of each high-frequency switching leg. For example, with reference to FIG. 2A, switches 222₁ and 224₁ may transition between states out of phase (e.g., switch 222₁ may be in the on-state, and switch 224₁ may be in the off-state, or vice versa). Similarly, switches 222₂ and 224₂ may transition between states out of phase. In such a case, high-frequency switching legs 202₁ and 202₂ may alternately conduct current between DC terminal 214₁ or 214₂ to AC terminal 214. Thus, the switching frequency of switches 222₁, 222₂, 224₁ and 224₂ may be reduced (e.g., relative to in-phase switching). However, the effective switching frequency may be maintained.

Although the description herein above may relate to an apparatus in which a power source (e.g., power source 230—FIG. 2A, power source 332—FIG. 3A, power source 436—FIG. 4A) provides power to a load (e.g., load 228—FIG. 2A, load 326—FIG. 3A, load 426—FIG. 4A), aspects of the disclosure herein may relate to a case where the direction of flow of power may be reversed. For example, an apparatus according to aspects of the disclosure herein may be an inverter, or a rectifier.

One or more aspects of the disclosure may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:
1. A power converter comprising:
a controller;
direct current (DC) terminals coupled to a DC power source;
a first switching leg comprising a first plurality of switches, wherein the first switching leg is coupled to the DC terminals and to a first alternating current (AC) terminal;

a second switching leg comprising a second plurality of switches, wherein the second switching leg is coupled to the DC terminals and to the first AC terminal; and
a third switching leg comprising a third plurality of switches, wherein the third switching leg is coupled to the DC terminals and to a second AC terminal,
wherein the controller is configured to:
control the first plurality of switches of the first switching leg to switch at a first frequency, and the second plurality of switches of the second switching leg to switch at a second frequency, so as to generate a first power waveform at the first AC terminal, and
control the third plurality of switches of the third switching leg to switch at a third frequency, so as to generate a second power waveform at the second AC terminal, the third frequency being lower than the first frequency and the second frequency.

2. The power converter of claim 1, wherein the first switching leg, the second switching leg, or the third switching leg comprises a two-level switching leg, and
wherein the two-level switching leg comprises two switches coupled in series at a node.

3. The power converter of claim 1, wherein the first switching leg, the second switching leg, or the third switching leg comprises a three-level switching leg.

4. The power converter of claim 3, wherein the three-level switching leg comprises a neutral-point clamped leg,
wherein the neutral-point clamped leg comprises at least four switches,
wherein a first two of the at least four switches are coupled in series at a node, and
wherein a second two of the at least four switches are coupled in series between a third DC terminal and one of: the node, or the second AC terminal.

5. The power converter of claim 1, further comprising an inductor,
wherein the inductor is coupled between the first AC terminal and the second switching leg,
wherein the inductor comprises a first winding having a first end and a second end,
wherein the inductor comprises a second winding having a third end and a fourth end,
wherein the first end of the first winding is coupled to the third end of the second winding at a node,
wherein the second end of the first winding is coupled to the first switching leg, and
wherein the fourth end of the second winding is coupled to the second switching leg.

6. The power converter of claim 1, wherein the third frequency is a frequency of a power waveform of a power delivery network.

7. The power converter of claim 1, wherein the controller is configured to control the first switching leg and the second switching leg to generate the first power waveform biased, at a time, by a voltage level, and
wherein the controller is configured to control the third switching leg to generate the second power waveform, at the time, with an amplitude comprising the voltage level.

8. The power converter of claim 7, wherein the controller is configured to control the first switching leg and the second switching leg based on a pulse width modulation (PWM) signal,
wherein the controller is configured to generate the PWM signal based on a reference signal and a carrier signal, and wherein the reference signal is biased, at the time, by a second voltage level proportional to the voltage level.

9. The power converter of claim 1, wherein the second power waveform is a square wave.

10. The power converter of claim 9, wherein the second power waveform is a modified square wave.

11. The power converter of claim 1, wherein the second power waveform is synchronized to a power signal of a power delivery network.

12. The power converter of claim 1, wherein the controller is configured to determine a phase shift between the first switching leg and the second switching leg.

13. The power converter of claim 12, wherein the controller is configured to switch the first plurality of switches in the first switching leg and the second plurality of switches in the second switching leg in phase.

14. The power converter of claim 12, wherein the controller is configured to switch the first plurality of switches in the first switching leg and the second plurality of switches in the second switching leg out of phase.

15. The power converter of claim 1, further comprising a first filter and a second filter, wherein the first filter is coupled between the first switching leg and the AC terminal, wherein the second filter is coupled between the first switching leg and the AC terminal, and wherein the first filter comprises a first inductor, and wherein the second filter comprises a second inductor.

16. An apparatus comprising:

a first power converter comprising:

a controller;

direct current (DC) terminals configured to be coupled to a DC power source;

a first switching leg comprising a first plurality of switches, wherein the first switching leg is coupled to the DC terminals and to a first alternating current (AC) terminal;

a second switching leg comprising a second plurality of switches, wherein the second switching leg is coupled to the DC terminals and to the first AC terminal; and a third switching leg comprising a third plurality of switches, wherein the third switching leg is coupled to the DC terminals and to a second AC terminal, wherein the controller is configured to:

control the first plurality of switches of the first switching leg to switch at a first frequency, and the second plurality of switches of the second switching leg to switch at a second frequency, so as to generate a first power waveform at the first AC terminal, and control the third plurality of switches of the third switching leg to switch at a third frequency, so as to generate a second power waveform at the second AC terminal, the third frequency being lower than the first frequency and the second frequency;

a second power converter comprising a third AC terminal and a fourth AC terminal, wherein the second power converter is coupled to the DC terminals, and wherein the second power converter is configured to generate a third power waveform at the third AC terminal and a fourth power waveform at the fourth AC terminal; and a third power converter comprising a fifth AC terminal and a sixth AC terminal, wherein the third power converter is coupled to the DC terminals, and wherein the third power converter is configured to generate a fifth power waveform at the fifth AC terminal and a sixth power waveform at the sixth AC terminal.

17. The apparatus of claim 16, wherein the second power converter generates the third power waveform and the fourth power waveform at 120 degrees phase shift with respect to the first power waveform or the second power waveform, and wherein the third power converter generates the fifth power waveform and the sixth power waveform at 120 degrees phase shift with respect to the first power waveform or the second power waveform, and with respect to the third power waveform or the fourth power waveform.

18. The apparatus of claim 16, wherein the first AC terminal and the second AC terminal are coupled to a converter-side winding of a transformer, and wherein network-side windings of the transformer are coupled to a power delivery network.

19. A method comprising:

controlling, by a controller, a first plurality of switches in a first switching leg to switch at a first frequency;

generating, based on controlling the first plurality of switches, at a first alternating current (AC) terminal, a first power waveform;

controlling, by the controller, a second plurality of switches in a second switching leg to switch at a second frequency, wherein the second frequency is lower than the first frequency; and generating, based on the controlling the second plurality of switches, at a second AC terminal, a second power waveform, wherein the generating the first power waveform comprises:

determining, based on a reference signal, and based on a modulating signal, a first switching scheme for the first plurality of switches;

controlling the first plurality of switches to transition between an on-state and an off-state at the first frequency, based on the first switching scheme, to generate a pulsed power waveform at a node of the first switching leg; and filtering the pulsed power waveform to generate the first power waveform, and wherein the generating the second power waveform comprises:

determining, based on a second reference signal, a second switching scheme for the second plurality of switches and controlling the second plurality of switches to transition between an on-state and an off-state at a second frequency, based on the second switching scheme, to generate the second power waveform at a node of the second switching leg.

20. The method of claim 19, wherein the second power waveform is synchronized to a power signal of a power delivery network.

\* \* \* \* \*